US008682121B2

(12) United States Patent
Okayama

(10) Patent No.: US 8,682,121 B2
(45) Date of Patent: Mar. 25, 2014

(54) OPTICAL WAVELENGTH FILTER WITH WAVELENGTH CHARACTERISTIC VARIATION MINIMIZED

(75) Inventor: Hideaki Okayama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 287 days.

(21) Appl. No.: 13/209,925

(22) Filed: Aug. 15, 2011

(65) Prior Publication Data
US 2012/0051689 A1  Mar. 1, 2012

(30) Foreign Application Priority Data
Aug. 27, 2010  (JP) ................................. 2010-191187

(51) Int. Cl.
G02B 6/34  (2006.01)
G02B 6/26  (2006.01)
G02B 6/42  (2006.01)

(52) U.S. Cl.
USPC .................................. 385/37; 385/27; 385/31

(58) Field of Classification Search
USPC ........................................................... 385/37
See application file for complete search history.

(56) References Cited

U.S. PATENT DOCUMENTS

| 6,304,687 | B1 * | 10/2001 | Inoue et al. ...................... 385/14 |
| 6,377,723 | B1 | 4/2002 | Saito et al. |
| 6,542,685 | B1 | 4/2003 | Yoneda |
| 6,873,761 | B2 * | 3/2005 | Yoneda ........................... 385/37 |
| 6,925,231 | B2 * | 8/2005 | Lazaro Villa et al. ........... 385/37 |
| 2002/0122623 | A1 * | 9/2002 | Yoneda ............................. 385/37 |
| 2002/0154846 | A1 * | 10/2002 | Nolan et al. ..................... 385/14 |
| 2005/0129363 | A1 * | 6/2005 | McGreer .......................... 385/37 |
| 2010/0150499 | A1 * | 6/2010 | Kim et al. ........................ 385/37 |
| 2011/0102804 | A1 * | 5/2011 | Lipson et al. ................. 356/480 |
| 2012/0051689 | A1 * | 3/2012 | Okayama ........................ 385/14 |

FOREIGN PATENT DOCUMENTS

| JP | 2000-035523 A | 2/2000 |
| JP | 2001-083339 A | 3/2001 |

OTHER PUBLICATIONS

Teng et al., "Athermal Silicon-on-insulator ring resonators by overlaying a polymer cladding on narrowed waveguides", Optics Express, vol. 17, No. 17, pp. 14627-14633, Aug. 17, 2009.
Uenuma et al., "Temperature-independent silicon waveguide optical filter", Optics Letters, vol. 34, No. 5, pp. 599-601, Mar. 1, 2009.

* cited by examiner

Primary Examiner — Rhonda Peace
(74) Attorney, Agent, or Firm — Rabin & Berdo, P.C.

(57) ABSTRACT

An optical wavelength filter has optical waveguides each of which includes a cladding layer and a core having a refractive index that is as high as that of the cladding layer by a factor of 1.4 or more. Each optical waveguide is partitioned into a reference section providing a reference and an adjustment section for adjusting phase differences. The reference section of each optical waveguide is so set that the optical waveguide in this section has a first equivalent refractive index and a first length. The adjustment section is so set that the waveguide in this adjustment section has a second equivalent refractive index and a second length. Two waves of light outputted from the output ends of adjacent two of the optical waveguides interfere with each other with a predetermined phase difference, thereby accomplishing independency of temperature and dimensional error.

14 Claims, 17 Drawing Sheets

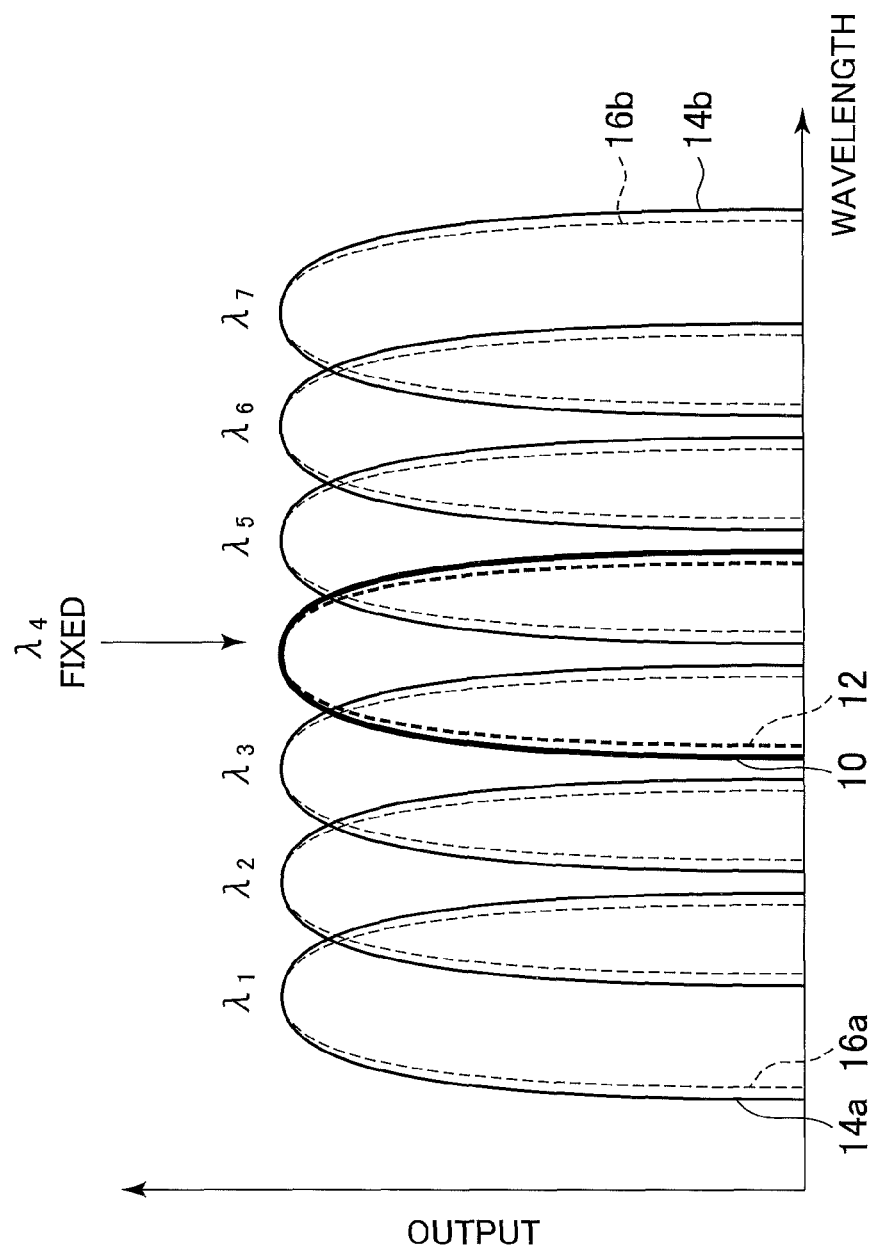

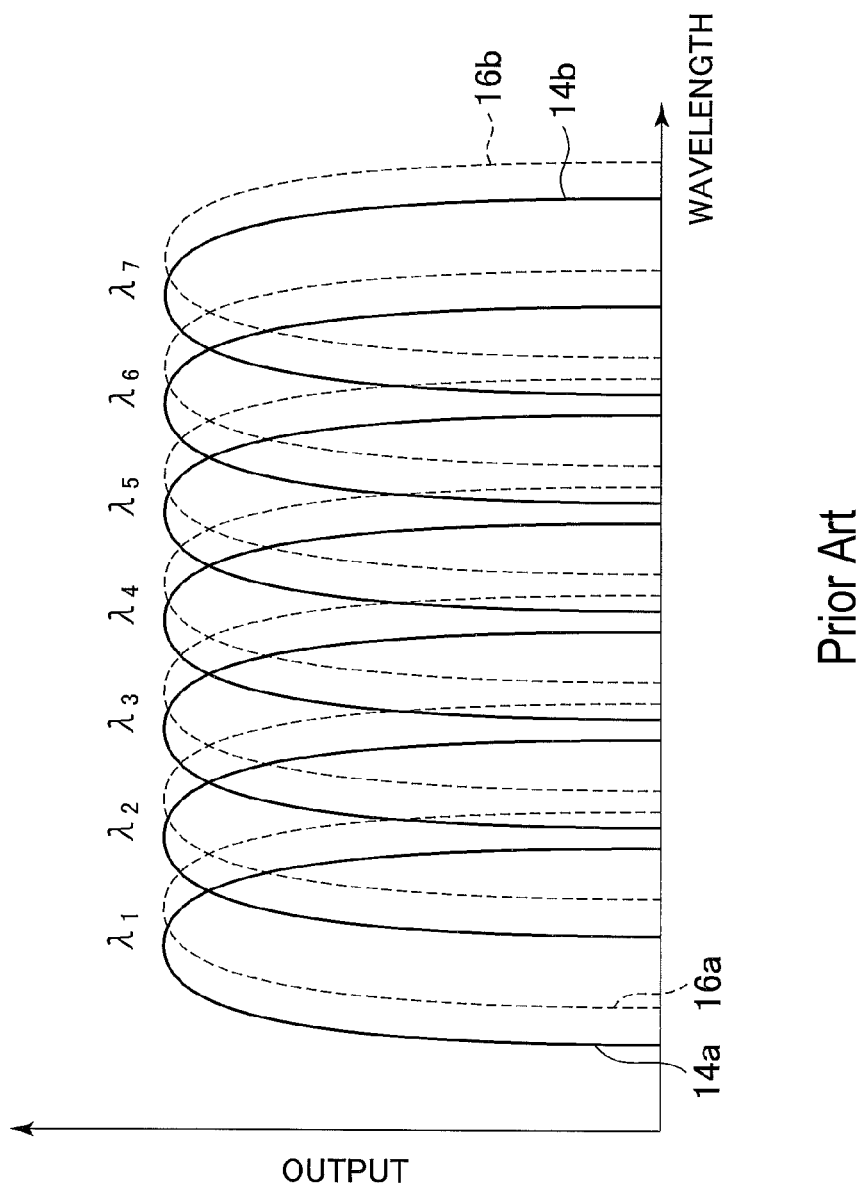

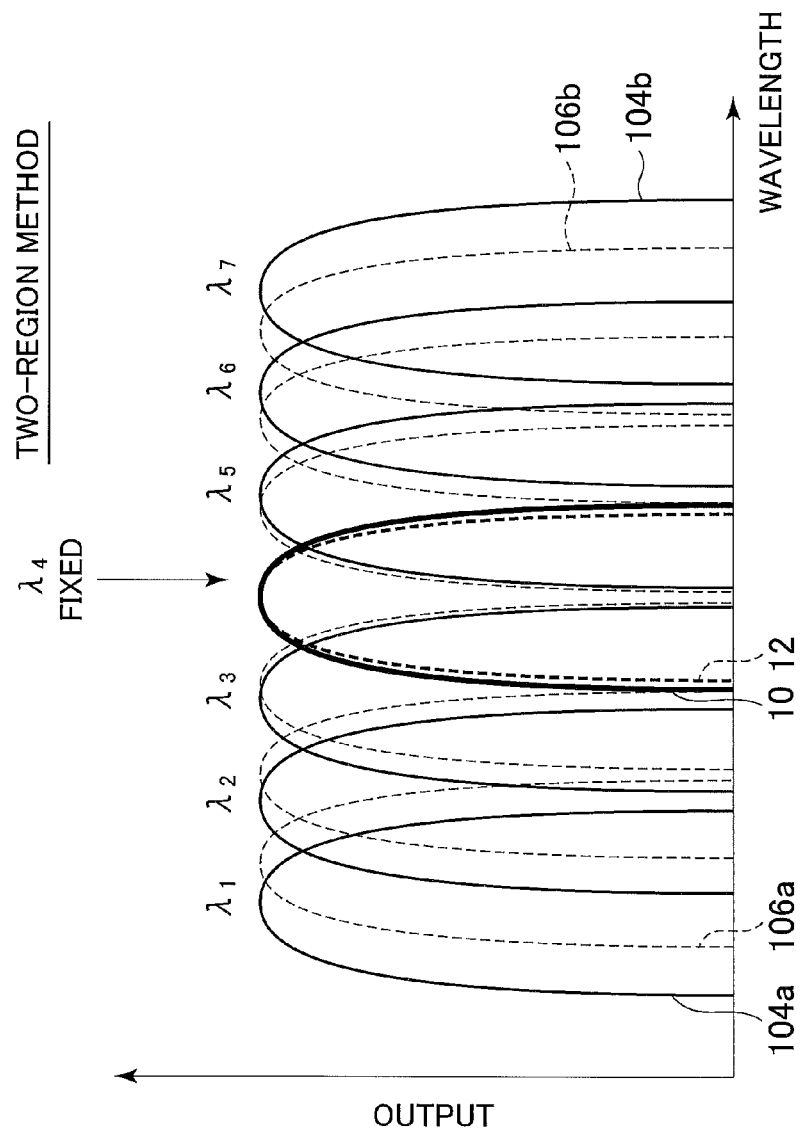

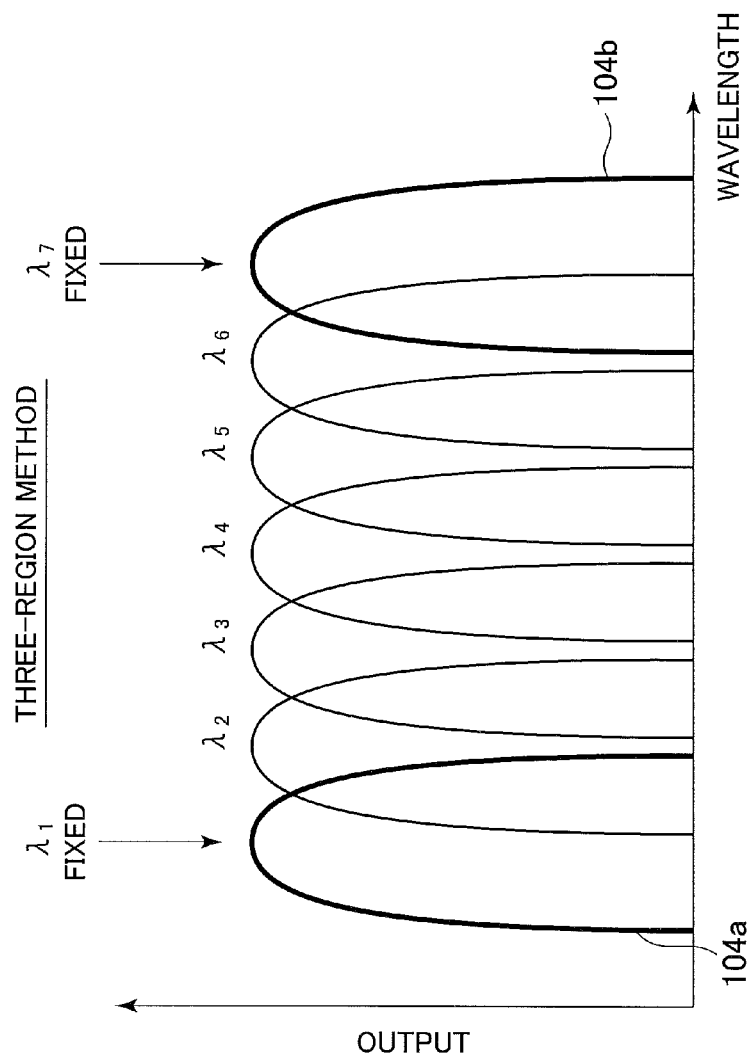

OPTICAL WAVELENGTH FILTER WITH WAVELENGTH CHARACTERISTIC VARIATION MINIMIZED

BACKGROUND OF THE INVENTION

1. Field of the Invention

The present invention relates to an optical wavelength filter and, more particularly, to an optical wavelength filter in the form of arrayed waveguide grating (AWG) for use in an optical coupler/splitter of optical waveguide type which separates input light having different wavelengths multiplexed into the wavelengths of light to output the separated wavelengths of light.

2. Description of the Background Art

In recent years, techniques using silicon (Si) as a waveguide material have begun to attract attention. Silicon has the feature that it is higher in refractive index than silicon oxide ($SiO_2$) and polymeric materials and, therefore, such high-refractive-index materials are used in the cores of optical circuit devices of optical waveguide type. Use of those materials promotes miniaturization of optical circuit devices of optical waveguide type and mass-production of equipment employing such optical circuit devices. It is expected that those optical circuit devices will find various applications.

One example of application is an optical coupler for multiplexing different wavelengths of optical signal onto a single optical waveguide channel. Another example is an optical splitter for separating different wavelengths of optical signal multiplexed on a single optical waveguide from each other. The optical couplers and splitters are very important devices in a large-capacity optical communication system, known as wavelength division multiplexing (WDM), of multiplexing a large bundle of wavelengths over a single optical fiber for optical transmission. Furthermore, to an optical coupler or splitter that combines or splits different wavelengths of optical signal, preferably applicable are optical circuit devices of optical waveguide type, which does not require the optical axes thereof to be aligned.

The optical coupler/splitter may also be referred to as an optical wavelength filter, because of its nature of selectively transmitting certain wavelengths of light. Examples of optical wavelength filters of optical waveguide type acting as an optical coupler/splitter are of using a Mach-Zehnder interferometer, a directional coupler, or diffraction grating. In particular, as an optical wavelength filter of optical waveguide type applicable to separating plural signals of different wavelengths multiplexed on a light beam, an arrayed waveguide grating (AWG) having arrayed waveguides will be found.

Thus, optical circuit devices including an optical wavelength filter having the cores of its optical waveguides made of a high-refractive index material such as silicon can be miniaturized and mass-produced. An optical waveguide having its core made of silicon may be referred to as a silicon waveguide.

Silicon has the feature that its refractive index is significantly dependent upon temperature. Therefore, an optical wavelength filter having a silicon waveguide involves the problem that the wavelength characteristics vary with temperature. In order to overcome the difficulty in temperature dependency, various methods have been discussed. One specific example of solution is disclosed in J. Teng, et al., "Athermal Silicon-on-insulator ring resonators by overlaying a polymer cladding on narrowed waveguides", Optics Express, Vol. 17, No. 17, pp. 14627-14633, Aug. 17, 2009. Another example is disclosed in M. Uenuma, et al., "Temperature-independent silicon waveguide optical filter", Optics Letters, Vol. 34, No. 5, pp. 599-601, Mar. 1, 2009.

J. Teng, et al., discloses a solution of using a polymer clad in an optical wavelength filter having a silicon waveguide. This solution is the simplest measure in eliminating the temperature dependency of the silicon waveguide. However, polymeric materials involve intrinsic problems that they are inferior in durability and reliability to inorganic materials such as silicon.

M. Uenuma, et al., discloses a method of designing a Mach-Zehnder interferometer having a silicon waveguide having its optical waveguide structure not depending on temperature. This method is superior to J. Teng, et al., in that the former uses no polymeric material. M. Uenuma, et al., however, suffers from the problem that the method is not practical because of its nature of small or marrow allowance against dimensional errors introduced when fabricated and of restricted applications.

So far as optical wavelength filters having an optical waveguide having its core made of a quartz-based material are concerned, various solutions for removing the temperature dependency have been heretofore developed, as disclosed in U.S. Pat. No. 6,377,723 B1 to Saito et al., Japanese Patent Laid-Open Publication Nos. 2000-035523 and 2001-083339, and U.S. Pat. No. 6,542,685 B1 to Yoneda.

However, silicon is larger in temperature dependency of refractive index than quartz-based materials. Therefore, it would have been difficult to remove the temperature dependency if solutions for the quartz-based materials were applied to optical wavelength filters having a silicon waveguide.

SUMMARY OF THE INVENTION

It is therefore an object of the present invention to provide an optical wavelength filter having an optical waveguide with variation in wavelength characteristic of its core minimized.

It is another object of the present invention to provide an optical wavelength filter including an optical waveguide having a core made of a material of high refractive index such as silicon with variation in wavelength characteristic minimized when the ambient temperature varies and/or a dimensional error is introduced during fabrication.

In accordance with the invention, an optical wavelength filter for separating input light having different wavelengths multiplexed into respective wavelengths of light to output the separated wavelengths of light comprises a plurality of optical waveguides for propagating the input light from an input end receiving the input light to an output end, each of the plurality of optical waveguides comprising a substrate, a cladding layer formed on the substrate, and a core of a material having a refractive index at least as high as a refractive index of the cladding layer by a factor of 1.4, the core being formed on the cladding layer in a strip-like shape having a thickness of 400 nm at most, wherein each of the optical waveguides is partitioned into a reference section providing a reference and an adjustment section for adjusting a phase difference, the reference section is set to a first partitioning condition in which the optical waveguide in the reference section has a first equivalent refractive index and a first length, and the adjustment section is set to a second partitioning condition in which the optical waveguide in the adjustment section has a second equivalent refractive index and a second length, whereby an interference condition is satisfied in which two waves of light outputted from the output ends of adjacent two of the optical waveguides interfere with each other with a predetermined phase difference therebetween.

In accordance with the invention also, an optical wavelength filter for separating input light having different wavelengths multiplexed into respective wavelengths of light to output the separated wavelengths of light comprises a plurality of optical waveguides for propagating the input light from an input end receiving the input light to an output end, each of the optical waveguides comprising, a substrate, a cladding layer formed on the substrate, and a core of a material having a refractive index at least as high as a refractive index of the cladding layer by a factor of 1.4, the cladding layer being formed on the cladding layer in a strip-like shape having a thickness of 400 nm at most, wherein each of the optical waveguides is partitioned into a reference section providing a reference and a first and a second adjustment section for adjusting a phase difference, the reference section is set to a first partitioning condition in which the optical waveguides in the reference section has a first equivalent refractive index and a first length, the first adjustment section is set to a second partitioning condition in which the optical waveguide in the first adjustment section has a second equivalent refractive index and a second length, and the second adjustment section is set to a third partitioning condition in which the optical waveguide in the second adjustment section has a third equivalent refractive index and a third length, whereby an interference condition is satisfied in which two waves of light outputted from the output ends of adjacent two of the optical waveguides interfere with each other with a predetermined phase difference therebetween.

In accordance with the present invention, an optical wavelength filter having optical waveguides including cores made of a material such as silicon having a high refractive index is provided in which variations in wavelength characteristic caused by at least either of temperature fluctuation and dimensional error caused during fabricating the optical waveguides. In particular, at least one of the temperature independency of the filter and the insensitiveness to dimensional error caused in fabricating the optical waveguides can be enhanced. The insensitiveness to dimensional error means that variation in wavelength characteristic is reduced or minimized which may be caused by deviation or error in width or thickness of the optical waveguide caused during fabrication.

BRIEF DESCRIPTION OF THE DRAWINGS

The objects and features of the present invention will become more apparent from consideration of the following detailed description taken in conjunction with the accompanying drawings in which:

FIG. 1A is a graph for use in conceptually understanding the operation of an arrayed waveguide grating (AWG) based on a two-region method applied to an optical wavelength filter in accordance with the present invention;

FIG. 1B is a graph for use in conceptually understanding the operation of an AWG of a conventional optical wavelength filter;

FIG. 9A is a graph useful for conceptually understanding variation in wavelength characteristic dependent upon temperature on the AWG shown in FIG. 1A;

FIG. 9B is a graph useful for conceptually understanding the operation of an AWG based on a three-region method applied to an optical wavelength filter in accordance with the invention;

DESCRIPTION OF THE PREFERRED EMBODIMENTS

Figure 2A:
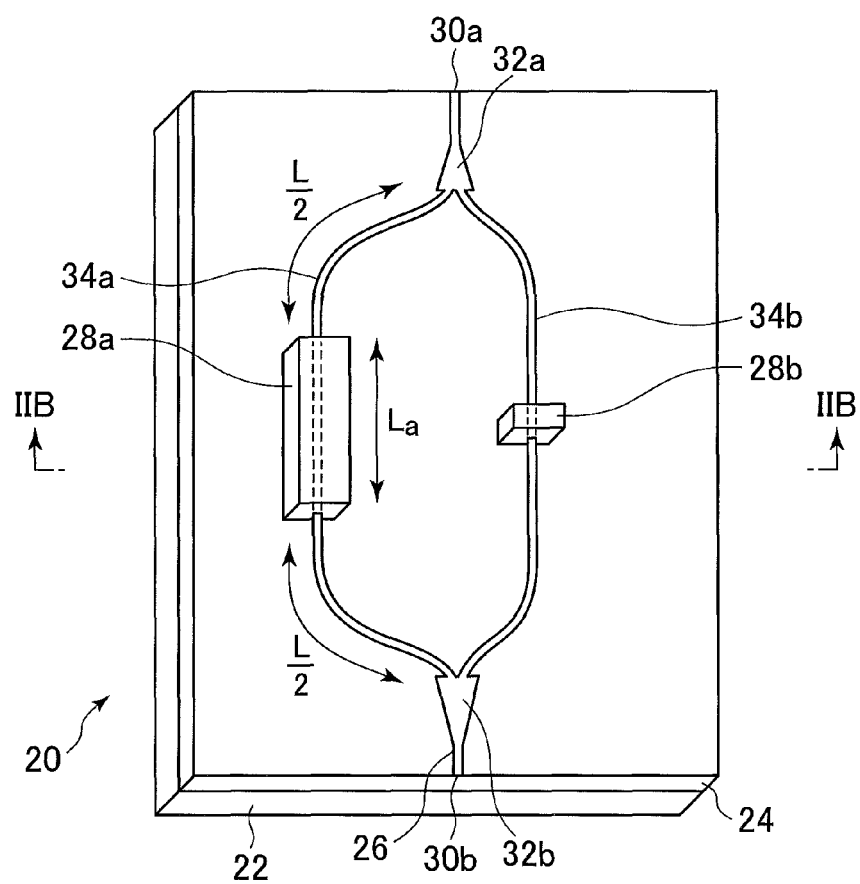
FIG. 2A is a schematic perspective view of a preferred embodiment of Mach-Zehnder interferometer employing an optical wavelength filter in accordance with the invention.

Preferred embodiments of an optical wavelength filter according to the present invention will be described in detail with reference to the accompanying drawings. Referring first to FIGS. 1A and 1B, a preferred embodiment of the optical wavelength filter according to the present invention includes silicon waveguides having solved the problems that the temperature dependency of the refractive index and the variation in wavelength characteristic responsive to a dimensional error within a tolerable range be minimized. Each of the optical waveguides of the optical wavelength filter is made of a strip-like core having a thickness of 400 nm or less and a cladding layer being in contact with the core. The core is manufactured from a material having its refractive index as high as that of the cladding layer by a factor of 1.4 or more. The material of the core may not be restricted to silicon, but germanium-based materials or compound semiconductors may also be used. For example, the optical wavelength filter may include its core made of silicon and its cladding layer made of a polymeric material.

In addition, the thickness of the core is set to 400 nm or less as mentioned above in order to have the waveguide mode of the optical waveguides set to a single mode. The width of the core can be in a range from 150 nm to 1,000 nm.

Furthermore, the present invention is intended to solve the problem with an optical wavelength filter having optical waveguides each having its core made of a material of a refractive index meeting the condition described above, i.e. to reduce or minimize variation in wavelength characteristic caused by the temperature dependency of the refractive index. Specifically, the optical wavelength filter exhibits its advantageous effects when the optical waveguides have the cores made of a material having its refractive index as high as that of the cladding layer by a factor of 1.4 or more.

The optical wavelength filter of the present embodiment has plural optical waveguides, each of which is partitioned into a reference section providing a reference and an adjustment section for adjusting a phase difference. That is, to the optical wavelength filter, a "two-region method" based on two regions which are different in optical waveguide structure is applied.

The principle of operation of the optical wavelength filter of the instant embodiment will first be described. The filter of this embodiment employs an arrayed waveguide grating (AWG) having one input port and seven output ports. The operation of the AWG based upon the two-region method is conceptually illustrated in FIG. 1A. The operation of the conventional optical wavelength filter is conceptually illustrated in FIG. 1B. In both FIGS. 1A and 1B, the horizontal axis indicates the wavelength of the output light while the vertical axis indicates the relative intensity of the output light.

Each of the seven output ports on the AWG outputs light different in wavelength from each other but in the same intensity. The AWG is so designed that each of the seven output ports outputs different one of wavelengths of $\lambda_1$ through $\lambda_7$ of light at a predetermined operating temperature. Any adjacent two of the optical waveguides output the waves of light different in phase from each other by a certain phase difference. The phase difference between the two waves of light may therefore cause a positive interference therewith. As a result of the interferences, the output ports output the respective wavelengths of $\lambda_1$ to $\lambda_7$ of light.

Here, the wavelength $\lambda_4$ is the center wavelength of an operating wavelength range. In the AWG of the instant embodiment, the optical waveguides has its structure designed, as can be seen from FIG. 1A, such that the wavelength characteristic does not vary at the center wavelength $\lambda_4$ in spite of fluctuation or variation in temperature. In other words, the optical waveguides has its structure designed such that the interference condition is not affected by temperature fluctuation. The center wavelength $\lambda_4$ thus does not vary with temperature fluctuation so as to be held constant against temperature fluctuation provided that the optical waveguides have been fabricated just as designed without introducing dimensional error in fabrication.

The structure of an optical wavelength relies upon its equivalent refractive index and geometric length. In the present embodiment, each of the waveguides is partitioned into two sections, reference and adjustment sections. For each optical waveguide, the equivalent refractive index and geometric or physical length are set in advance for its respective sections. The equivalent refractive index of an optical waveguide may be designed in advance by controlling its width, the material of its cladding layer, how its cladding layer is in contact with its core, and the like.

Further with reference to FIGS. 1A and 1B, the AWG of the instant preferred embodiment has its center wavelength $\lambda_4$ held constant, i.e. fixed, against temperature fluctuation. FIG. 1A includes a bold line 10 plotting the wavelength characteristic prior to a temperature fluctuation on the output port corresponding to the center wavelength $\lambda_4$. It can be seen from FIG. 1A that the bold line 10 almost agrees with a bold dotted line 12 indicating the characteristic after the temperature fluctuation. Further in the figure, the operating wavelength range has its opposite ends delineated by the wavelengths $\lambda_1$ and $\lambda_4$. The wavelength characteristics obtained prior to the temperature fluctuation from the output ports corresponding to the wavelengths $\lambda_1$ and $\lambda_7$ are indicated by thin solid lines 14a and 14b, respectively. It can also be seen from FIG. 1A that the thin solid lines 14a and 14b hardly deviate from thin dotted lines 16a and 16b, respectively, indicating the wavelength characteristics after the temperature fluctuation.

In contrast, in a case where there is no fixed wavelength, as shown in FIG. 1B, the thin dotted lines 16a and 16b indicating the wavelength characteristics obtained after a temperature fluctuation generally deviate or shift from the thin solid lines 14a and 14b indicating the wavelength characteristics obtained prior to the temperature fluctuation. More specifically, on the output ports corresponding to the wavelengths $\lambda_1$ to $\lambda_7$, the wavelength characteristics exhibited after the temperature fluctuation deviate from the wavelength characteristics exhibited prior to the temperature fluctuation. In some cases, an extensive deviation may occur. As can be seen from the result of the comparison, in the AWG of the present embodiment, the center wavelength $\lambda_4$ is held constant against temperature fluctuation, and thus the AWG is rendered temperature-independent, which means the wavelength characteristic is not affected by temperature fluctuation. In the instant embodiment, what is held constant is the center wavelength. The present invention may, however, not be restricted to this specific way so far as the AWG may have one wavelength fixed within its operating wavelength range. A wavelength other than the center wavelength within the operating wavelength range may be fixed.

In the foregoing, the AWG was described which is temperature-independent. According to the present illustrative embodiment, the AWG may be made insensitive to deviation of the width and/or thickness of its optical waveguides in a similar way. More specifically, in order not to cause dimensional errors such as deviation in width and thickness introduced during fabrication of optical waveguides to affect the interference condition at the center wavelength $\lambda_4$, the structure of the optical waveguides of the AWG may be designed. Such designing renders the center wavelength $\lambda_4$ constant despite dimensional errors. Thus, the wavelength characteristic is not affected by the dimensional errors in the same way as the foregoing. The AWG thus can attain independency of, or insensitiveness to, deviation in width and/or thickness of its optical waveguides, for example. In the context, at least as far as the wavelength of an AWG is concerned, the term "constant" or "fix" may be understood as, in addition to its general meaning, rendering a wavelength independent of temperature and/or dimensional error in its operating wavelength range.

As will be described later, deviation in width or thickness of an optical waveguide greatly affects the equivalent refractive index. In order to substantially reduce variation in optical characteristic caused by such a dimensional error, it is very much important to increase the allowance range of dimensional errors in fabricating optical waveguides.

When only the temperature varies, the equivalent refractive index varies relatively slightly. For example, under the condition that the center wavelength is 1,550 nm, and an optical waveguide has its width of 300 nm and thickness of 300 nm with no dimensional error, the equivalent refractive index varies by 0.011% per centigrade. In contrast, when the width or thickness of an optical waveguide deviates, the equivalent refractive index varies by one order of magnitude compared with when the equivalent refractive index varies as temperature varies. For example, when the width deviates, the equivalent refractive index varies by 0.26% per nanometer of width deviation. This means that a variation in equivalent refractive index caused by a deviation in width of 1 nm is equivalent to when the temperature varies by 26° C.

Furthermore, if the structure of the optical waveguides of the AWG is designed such that the interference condition is not affected by both temperature fluctuation and dimensional error at the center wavelength $\lambda_4$, it is then possible to achieve both temperature independency and insensitiveness to width and/or thickness deviation.

An exemplified structure of the Mach-Zehnder interferometer in accordance with the instant preferred embodiment of the invention will be described by referring to FIGS. 2A and 2B. The Mach-Zehnder interferometer is an optical wavelength filter which receives input light of two multiplexed wavelengths different from each other and separates them to output.

As shown in FIG. 2A, the Mach-Zehnder interferometer, 20, has a substrate 22 and a lower cladding layer 24, and an optical waveguide core 26 and an upper cladding layer, generally 28 and specifically formed by components 28a and 28b. The substrate 22 may preferably be made of silicon (Si) to form a substrate layer. The lower cladding layer 24 may be formed by a core silicon oxide film of $SiO_2$ or SiON deposited on the silicon substrate 22. The waveguide core 26 may also be made of silicon. The waveguide core 26 is formed in a pre-designed pattern on the lower cladding layer 24 such as to act as a Mach-Zehnder interferometer. The manner in which the waveguide core 26 is patterned will be described later. The components 28a and 28b of the upper cladding layer may collectively be referred to as upper cladding layer 28.

The optical waveguide core 26 may be fabricated by patterning a silicon layer formed on the lower cladding layer 24, for example, by dry etching. In particular, the silicon substrate 22, lower cladding layer 24, and optical waveguide core 26 can be fabricated using an SOI (silicon-on-insulator) substrate having a silicon layer disposed over the silicon substrate 22 via a silicon oxide film. In that case, the optical waveguide core 26 may be formed by patterning the silicon layer disposed on the silicon oxide film that will be the lower cladding layer 24.

Figure 2B:
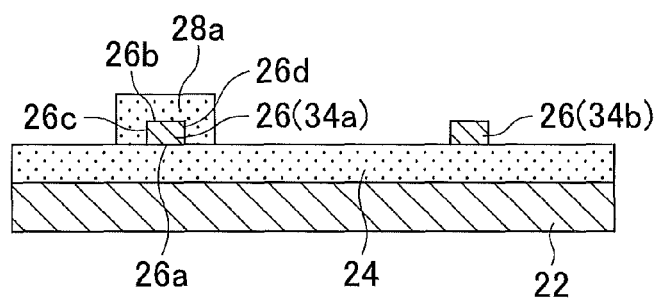
FIG. 2B shows an end surface of the Mach-Zehnder interferometer cut along and viewed from an arrowed line IIB-IIB shown in FIG. 2A.

In the current illustrative embodiment, if the substrate structure is cut vertically in FIG. 2A along line IIB-IIB perpendicular to the direction of light propagation, the optical waveguide core 26 would have its resulting end surface viewed which is substantially rectangular as shown in FIG. 2B. The length of the end surface in the widthwise direction is the width of the optical waveguides. The length of the end surface in the thickness direction is the thickness of the optical waveguides. The core 26 has its surface made contact with the lower cladding layer 24 defined as a bottom surface, and its surface opposite to the bottom surface as defined as a top surface. The core 26 also has its surfaces extending in the direction of propagation of light and connecting the top and bottom surfaces together are defined as side surfaces. The core 26 further has its surfaces perpendicular to the direction of propagation of light. One of the surfaces on which light is incident is defined as an incident end surface. The other surface from which the light emerges is defined as an exit end surface.

The components 28a and 28b of the upper cladding layer 28 are formed in a pre-designed pattern on the exposed lower cladding layer 24 and on the optical waveguide core 26 so as to cover parts of the core 26. On the lower cladding layer 24 and on the core 26, a cladding material such as silicon oxide ($SiO_2$ or SiON) may be deposited as a film, for example, by means of CVD (Chemical Vapor Deposition). The components 28a and 28b of the upper cladding layer 28 may be formed by patterning the film of cladding material thus deposited, for example, by dry etching.

As seen from FIG. 2B, in the region of the upper cladding layer 28 having the components 28a and 28b thus formed, the bottom surface 26a of the optical waveguide core 26 is in contact with the lower cladding layer 24 while the top surface 26b, and side surfaces 26c and 26d are in contact with the component 28a or 28b of the upper cladding layer. In the remaining region, the bottom surface 26a of the core 26 is in contact with the lower cladding layer 24 while the top surface 26b, and side surfaces 26c and 26d are exposed to the ambient. In this way, the upper cladding layer is different between the region having the components 28a and 28b formed and the remaining region in how the cladding layer is in contact with the core 26. Accordingly, the upper cladding layer 28 having the components 28a and 28b may be referred to as a "heterogeneous clad region" in terms of the contact mode of core with clad, that is, how to contact core with clad.

In addition, if the ambient atmosphere, e.g. air, is regarded as a sort of cladding material, it can be said that the optical waveguides are different in cladding material that is one of the constituent components thereof.

Now, the pattern in which the optical waveguide core 26 is formed will be described. The optical waveguide core 26 has an input waveguide 30a having the incident end surface, an output waveguide 30b having the exit end surface, tapering waveguides 32a and 32b, and connective waveguides 34a and 34b. The input waveguide 30a has its output end connected with the narrower, input end of the one tapering waveguide 32a. The tapering waveguide 32a has its wider, output end connected with the input ends of the connective waveguides 34a and 34b. The connective waveguides 34a and 34b have respective output ends connected with the wider, input end of the other tapering waveguide 32b. The tapering waveguide 32b has its narrower, output end connected with the input end of the output waveguide 30b.

The one tapering waveguide 32a may be formed in a Y-shaped branching waveguide to split light entered on the input end of the tapering waveguide 32a into portions conveyed to the connective waveguides 34a and 34b. The other tapering waveguide 32b may be formed in a Y-shaped coupling waveguide to couple rays of light entered from the connective waveguides 34a and 34b into one to output the latter from its output end. The connective waveguides 34a and 34b function as optical paths which interconnect the output end of the one tapering waveguide 32a to the input end of the other tapering waveguide 32b and are different in length from each other. That is, the connective waveguides 34a and 34b are optical waveguides which are different in optical path length.

The Mach-Zehnder interferometer 20, thus having the couple of optical paths different in length from each other, causes phase differences specific for the respective wavelengths to thereby separate different wavelengths of signal. The Mach-Zehnder interferometer 20 may be designed to have its couple of optical paths different in route length therebetween so that, when wavelengths $\lambda_1$ and $\lambda_2$ of light are entered, for example, positive and negative interferences will be caused with the wavelengths $\lambda_1$ and $\lambda_2$, respectively, thereby implementing an optical wavelength filter for selectively transmitting the wavelength $\lambda_1$ of light. The Mach-Zehnder interferometer 20 thus separates the wavelength $\lambda_1$ of light from the wavelengths $\lambda_1$ and $\lambda_2$ of light. Alternatively, the optical wavelength filter may be so designed that the wavelength $\lambda_2$ of light is separated from the wavelengths $\lambda_1$ and $\lambda_2$ of light.

As described previously, the region where the components 28a and 28b of the upper cladding layer are formed is different from the remaining region in how the cladding layer is in contact with the optical waveguide core 26, and therefore also different in equivalent refractive index of optical waveguide.

The sections of the optical waveguides, "adjustment section" and "reference section", will now be defined. The "adjustment section" is a section of an optical waveguide which corresponds to the upper cladding region having the components 28a and 28b for adjusting a phase difference. The "reference section" is a section of an optical waveguide providing a reference and corresponding to regions other than the adjustment section.

For example, in the connective waveguide 34a, the reference section has its geometric path length of L (=L/2+L/2), and the adjustment section has its geometric path length of $L_a$, which corresponds to the length of the component 28a of the upper cladding layer in the direction of propagation of light. The reference section has its equivalent refractive index of n, and the adjustment section has its equivalent refractive index of $n_a$.

As described earlier in connection with the principle of operation of an optical wavelength filter, in the instant illustrative embodiment, the structure of optical waveguides formed by the connective waveguides 34a and 34b is so designed that (1) a given phase difference is caused between two outputted waves of light to give rise to a positive interference and that (2) the interference condition is independent of temperature fluctuation and/or dimensional error.

More specifically, for the reference and adjustment sections of each of the connective waveguides 34a and 34b, the equivalent refractive index and geometric length of the optical waveguides are designed in advance so as to satisfy conditions (1) and (2). Consequently, the Mach-Zehnder interferometer 20 can thus be implemented which has, in addition to, or instead of, the temperature independency, the insensitiveness of the wavelength characteristic to dimensional error, such as width or thickness deviation, enhanced. Namely, the dependency of the wavelength characteristic on those factors can be reduced. A specific method of designing the optical waveguides will be described later.

An example of configuration of the Mach-Zehnder interferometer will next be described by referring to FIGS. 3A and 3B. The exemplified Mach-Zehnder interferometer 20 may be similar to the Mach-Zehnder interferometer shown in FIGS. 2A and 2B only except for the method by which the upper cladding layer is formed. Throughout the patent application, like components are designated with the same reference numerals and their repetitive description will be avoided.

Figure 3A:
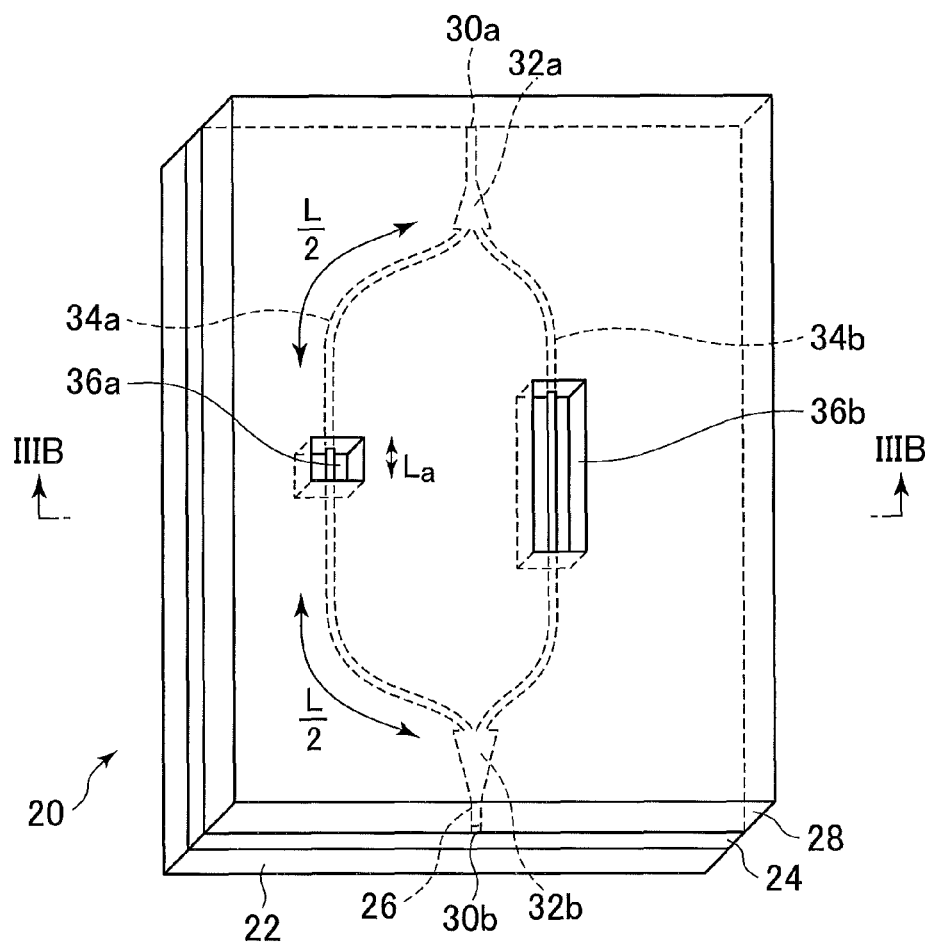
FIG. 3A is a schematic perspective view, like FIG. 2A, of another, exemplified structure of the Mach-Zehnder interferometer in accordance with the preferred embodiment.
Figure 3B:
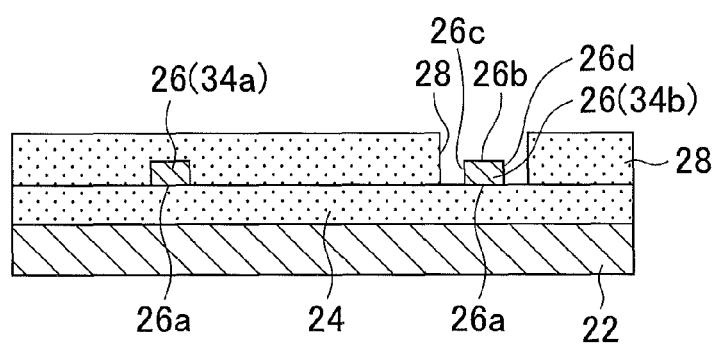
FIG. 3B shows an end surface, like FIG. 2B, of the Mach-Zehnder interferometer cut along and viewed from an arrowed line IIIB-IIIB shown in FIG. 3A.

The Mach-Zehnder interferometer 20 shown in FIGS. 3A and 3B includes a silicon substrate 22, a lower cladding layer 24 made of a silicon oxide film, an optical waveguide core 26 of silicon, and an upper cladding layer 28 of silicon oxide film, and has openings 36a and 36b cut therethrough. The upper cladding layer 28 is so formed as to cover part of the lower cladding layer 24 and optical waveguide core 26 which would otherwise be exposed, namely the surfaces thereof opposite to the substrate 22. The upper cladding layer 28 may be fabricated by depositing a film of cladding material such as silicon oxide film, for example, by CVD on the surface portions of the lower cladding layer 24 and optical waveguide core 26. The openings 36a and 36b may generally be referred to as opening 36 when it is unnecessary for discrimination between the openings 36a and 36b.

The openings 36a and 36b are formed in a pre-designed pattern to expose parts of the optical waveguide core 26 covered with the upper cladding layer 28. The openings 36a and 36b may be fabricated by partially removing the upper cladding layer 28 made of a cladding material, for example, by dry etching until the lower cladding layer 24 is partially exposed. The openings 36a and 36b are thus formed to expose the optical waveguide core 26 at the respective bottoms thereof.

In the regions where the openings 36a and 36b are formed, as seen from FIG. 3B, the bottom surface 26a of the optical waveguide core 26 is in contact with the lower cladding layer 24 while the top surface 26b and side surfaces 26c, 26d of the core 26 are in contact with the air, or ambient atmosphere. In the remaining regions, the bottom surface 26a of the core 26 is in contact with the lower cladding layer 24 while the top surface 26b and side surfaces 26c and 26d are in contact with the upper cladding layer 28. In this way, the region where the openings 36a and 36b are formed and the remaining regions are different from each other in mode of contact of the optical waveguide core 26 with the cladding layer or in material of the cladding. The region where the openings 36a and 36b are formed may thus be referred to as a "heterogeneous clad region".

Therefore, in the optical waveguides, the region where the openings 36a and 36b are formed is different from the remaining regions in equivalent refractive index. In accordance with the present embodiment, the adjustment section for adjusting the phase difference is a portion of the optical waveguide corresponding to the region where the openings 36a and 36b are formed. The reference section providing a reference is a portion of the optical waveguide corresponding to the regions other than the adjustment section. For example, in the connective waveguide 34a, the reference section has its geometric or mechanical path length of L, and the adjustment section has its geometric or mechanical path length of $L_a$, which corresponds to the length of the opening 36a in the direction of propagation of light.

In the Mach-Zehnder interferometer 20 shown in FIGS. 3A and 3B, like the Mach-Zehnder interferometer 20 shown in FIGS. 2A and 2B, the equivalent refractive index and geometric length of the optical waveguides are set in advance on the reference and adjustment sections of each of the connective waveguides 34a and 34b so as to satisfy the conditions (1) and (2). Consequently, with the exemplified interferometer 20 shown in FIGS. 3A and 3B also, the Mach-Zehnder interferometer 20 can thus be implemented which has, in addition to, or instead of, the temperature independency, the insensitiveness of the wavelength characteristic to dimensional error, such as width or thickness deviation, enhanced.

In the example of Mach-Zehnder interferometer 20 shown in FIGS. 3A and 3B, in contrast to the Mach-Zehnder interferometer 20 of FIGS. 2A and 2B, the optical waveguide core 26 is thus coated with the upper cladding layer 28 in the region where the openings 36a and 36b are not formed. Therefore, the difference in refractive index between the core 26 and the cladding layers is reduced. In consequence, the Mach-Zehnder interferometer 20 thus exemplified can suppress the scattering loss of light.

With both examples of Mach-Zehnder interferometer 20, the reference and adjustment sections are different from each other in mode of contact of the core with the cladding layer of the optical waveguide or in material of the cladding. The invention may not be restricted to the specific examples. The reference and adjustment sections may be designed to be identical either in mode of contact of the core forming a waveguide with the cladding layer or in material of the cladding and different in width and/or in thickness of the core. Because, a difference of the core in width or thickness between the reference and adjustment sections can cause the equivalent refractive index of each optical waveguide to vary.

An illustrative embodiment of an arrayed waveguide grating (AWG) employing an optical wavelength filter in accordance with the present invention will be described by referring to FIG. 4. The AWG, 40, is an optical wavelength filter having a light-splitting function of separating input light having different wavelengths of light multiplexed into the respective wavelengths of light to output the wavelengths of light.

The AWG 40 includes a couple of star couplers 42 and 44, and an arrayed waveguide portion 46. The one star coupler 42 is an optical splitter disposed on the input side of the AWG 40, and has a function of splitting the input light into plural rays of light to output the rays. The other star coupler 44 is an optical coupler disposed on the output side of the AWG 40, and has a function of combining plural rays of input light into a single ray of light to output the ray. The arrayed waveguide portion 46 is disposed between the star couplers 42 and 44 in the form of bundle of plural optical waveguides which are different from each other in length the optical paths. The star couplers 42 and 44, and the arrayed waveguide portion 46 are fabricated on a lower cladding layer built on a substrate, not shown, like the aforementioned Mach-Zehnder interferometer 20.

The one star coupler 42 has plural output ports interconnected on a boundary 42*a* to the respective input terminals of corresponding plural optical waveguides of the arrayed waveguide portion 46. The other star coupler 44 has plural input ports interconnected on another boundary 42*b* to the respective output terminals of the optical waveguides of the arrayed waveguide portion 46.

Figure 4:
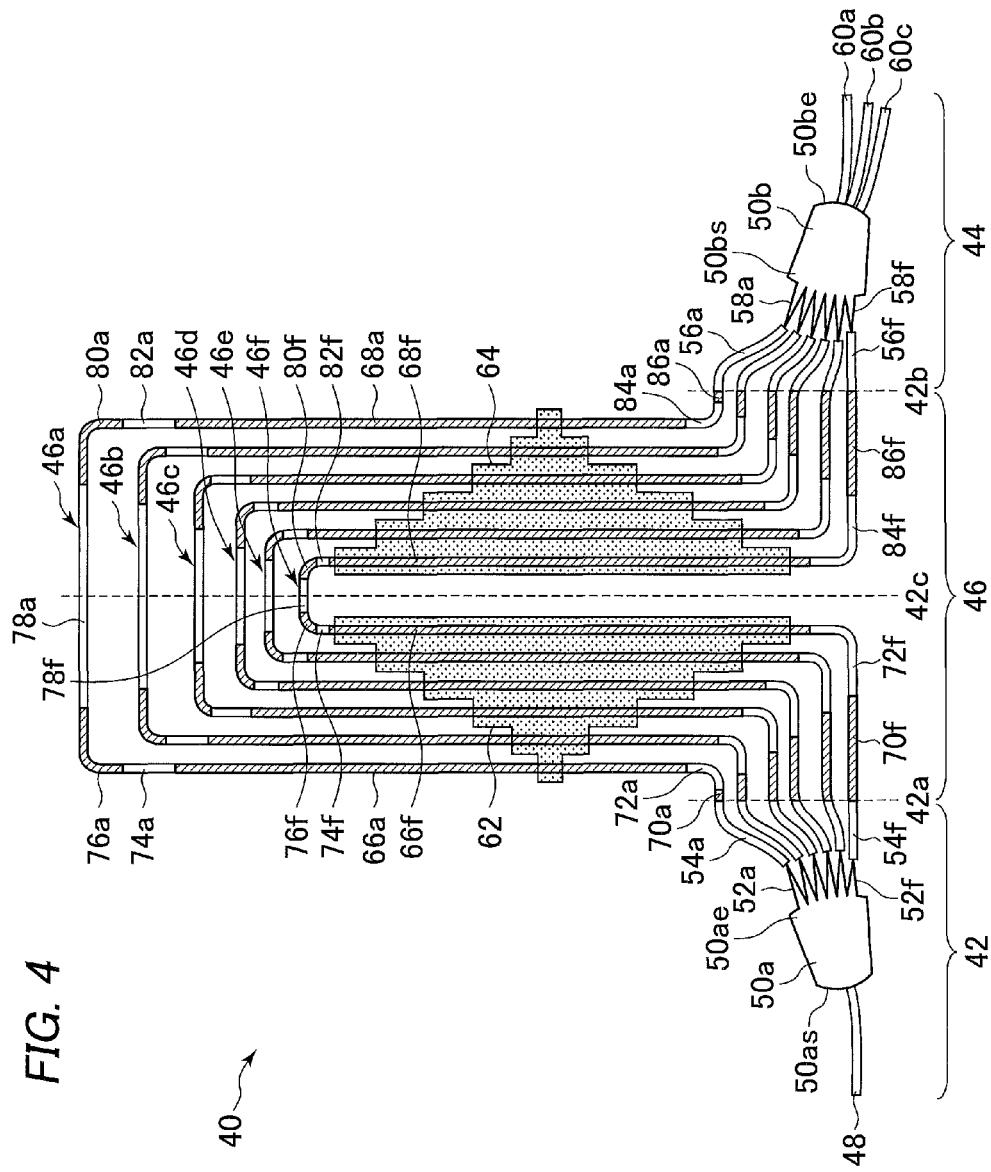
FIG. 4 is a plan view schematically showing the configuration of an AWG to which applied is an optical wavelength filter in accordance with the preferred embodiment.

The AWG 40 of the instant illustrative embodiment has six optical waveguides as shown in FIG. 4. Specifically, the one star coupler 42 divides the input light into six rays of light, and sends them to the corresponding, six optical waveguides of the arrayed waveguide portion 46. The other star coupler 44 receives six rays of light from the six waveguides of the arrayed waveguide portion 46, and combines the six rays to output the resulting ray of light. The structures of the components of the AWG 40 will be described in further detail.

The one star coupler 42 includes an input waveguide 48, a planar optical waveguide 50*a*, tapering optical waveguides 52*a* to 52*f*, and connective waveguides 54*a* to 54*f*. Since the input light is split into six components, the six tapering optical waveguides 52*a* to 52*f* are successively arranged downwardly as viewed in the figure. The six connective waveguides 54*a* to 54*f* are arranged in this order on the tapering optical waveguides 52*a* to 52*f* downwardly as viewed in the figure.

The planar optical waveguide 50*a* has a starting end boundary 50*as* and a terminal end boundary 50*ae*. The starting end boundary 50*as* is connected with the input waveguide 48. In the instant illustrative embodiment, the input waveguide 48 is a single length of optical fiber. The terminal end boundary 50*ae* is connected with the input ends of the tapering optical waveguides 52*a* to 52*f*. The tapering optical waveguides 52*a* to 52*f* have the output ends thereof connected with the input ends of the respective connective waveguides 54*a* to 54*f*. Each of the connective waveguides 54*a* to 54*f* is formed by a combination of curved and straight waveguides coupled such that the spacing therebetween increases along its length from its input to output port.

The other star coupler 44 may essentially be identical in configuration with the one star coupler 42 except that the orientation of the components is opposite to that of the one star coupler 42 and that it is coupled to output waveguides rather than the input waveguides. The star coupler 44 includes connective waveguides 56*a* to 56*f*, tapering optical waveguides 58*a* to 58*f*, a planar optical waveguide 50*b*, and output waveguides 60*a*, 60*b* and 60*c*. In the illustrative embodiment, the output waveguides 60*a*, 60*b* and 60*c* are three lengths of optical fiber, and the six connective waveguides 56*a* to 56*f* and the six tapering optical waveguides 58*a* to 58*f* are provided.

The optical waveguide 50*b* has a starting end boundary 50*bs* and a terminal end boundary 50*be*. The starting end boundary 50*bs* is connected with the output terminals of the tapering optical waveguides 58*a* to 58*f*. The terminal end boundary 50*be* of the optical waveguide 50*b* is connected with the input ends of the output waveguides 60*a*, 60*b* and 60*c*. The connective waveguides 56*a* to 56*f* have the output ends thereof connected with the input ends of the respective tapering optical waveguides 58*a* to 58*f*. Each of the connective waveguides 56*a* to 56*f* is formed by a combination of curved and straight waveguides so that the spacing therebetween decreases along its length from input to output port.

The arrayed waveguide portion 46 includes optical waveguides 46*a* to 46*f* and structural elements 62 and 64. The structural elements 62 and 64 are formed in order to introduce the adjustment sections which were earlier described in connection with the Mach-Zehnder interferometer. The structural elements 62 and 64 may be so configured, for example, that they have the upper cladding layer 28 covering part of the optical waveguide core 26 as shown in FIGS. 2A and 2B. The structural elements 62 and 64 may also be so configured that they have the openings 36 formed in the upper cladding layer 28 to expose part of the optical waveguide core 26 as shown in FIGS. 3A and 3B. In the AWG 40 of the present embodiment, each of the optical waveguides 46*a* to 46*f* has the structural elements 62 and 64 provided.

Between the boundaries 42*a* and 42*b*, a centerline 42*c* parallel thereto is assumed as shown in FIG. 4. The optical waveguides 46*a* to 46*f* are turned on the plane of the substrate or FIG. 4, that is, "folded", such that the arrayed waveguide portion 46 is in line symmetry with respect to the centerline 42*c*. The structural elements 62 and 64 are arranged also symmetrically with respect to the centerline 42*c* as described later. The provision of the structural elements 62 and 64 would require an increased size of the arrayed waveguide portion 46. With the illustrative embodiment, however, the optical waveguides 46*a* to 46*f* are thus folded so that the arrayed waveguide portion 46 can be made compact, or reduced in size, despite the provision of the structural elements 62 and 64. Accordingly, the AWG 40 can be made compact.

In the instant illustrative embodiment, the optical waveguides 46*a* to 46*f* are thus folded in two sections. The invention may not be restricted to this way of folding. The optical waveguides 46*a* to 46*f* may be folded into an even number of sections more than two such as four, six, eight, and so forth. By folding the optical waveguides into an even number of sections, the structural elements 62 and 64 may be sectioned into an even number of portions. If the number of folds is increased, the arrayed waveguide portion 46 can be made compact as such. In the present embodiment, the waveguide portion is folded in two and, consequently, the six optical waveguides 46a to 46f are arranged in this order from outside to inside, i.e. arranged toward the centerline 42c, as viewed in the figure.

The structure of the arrayed waveguide portion 46, more particularly the pattern in which the optical waveguides 46a to 46f are formed, will now be described. The waveguides 46a to 46f correspond to the optical waveguide core 26 shown in FIGS. 2B and 3B. The arrayed waveguide portion 46 generally includes two sets of straight waveguides 66a to 66f and 68a to 68f.

The two sets of straight waveguides 66a to 66f and 68a to 68f are arranged symmetrically with respect to the centerline 42c. The straight waveguides are so arranged that they convey the rays of light in the vertical direction, i.e. in parallel to the centerline 42c. The one set of straight waveguides 66a to 66f is provided with the one structural element 62 while the other set of straight waveguides 68a to 68f is provided with the other structural element 64. The structural elements 62 and 64 will be described later.

The arrayed waveguide portion 46 will be described in further detail. The arrayed waveguide portion 46 includes laterally extending straight waveguides 70a to 70f, curved waveguides 72a to 72f having the same curvature and the same angle of bending as each other, vertically extending straight waveguides 66a to 66f, other vertically extending straight waveguides 74a to 74f, other curved waveguides 76a to 76f having the same curvature and the same angle of bending as each other, other laterally extending straight waveguides 78a to 78f, still other curved waveguides 80a to 80f having the same curvature and the same angle of bending as each other, still other vertically extending straight waveguides 82a to 82f, still other vertically extending straight waveguides 68a to 68f, further curved waveguides 84a to 84f having the same curvature and the same angle of bending as each other, and still other laterally extending straight waveguides 86a to 86f.

It is to be noted that the symbols "a" to "f" affixed to the reference numerals of the waveguides denote that those waveguides form parts of their respective optical waveguides 46a to 46f. In the following, the optical waveguide 46a will be taken as an example for describing the connective relationship with the corresponding waveguides. Regarding the remaining optical waveguides 46b to 46f, corresponding straight waveguides are connected in the same way.

Description will be concentrated on one optical waveguide 46a as an example in order to describe the connective relationship between the waveguides included therein. The straight waveguide 70a has its input end connected for length adjustment with the output end of the connective waveguide 54a of the star coupler 42 on the boundary 42a. That causes the waveguide extended in the "lateral direction", i.e. in the rightward direction as viewed in the figure. The straight waveguide 70a has its output end connected with the input end of the curved waveguide 72a. That causes the light to be bent counterclockwise through 90° in the figure over the curved waveguide 72a to propagate in the "vertical direction", i.e. upwardly as viewed in the figure.

The curved waveguide 72a has its output end connected with the input end of the straight waveguide 66a. That causes the waveguide to be extended in the vertical direction. The straight waveguide 66a has its output end connected with the input end of the straight waveguide 74a. Thus, the straight waveguide 74a acts to adjust the geometric length of the waveguide to prevent the waveguide 74a from overlapping with the adjacent waveguide when the waveguide 74a is next bent. The straight waveguide 74a has its output end connected with the input end of the curved waveguide 76a. Because of this connection, light is bent clockwise through 90° over the curved waveguide 76a to propagate in the lateral direction, i.e. rightward as viewed in the figure.

The curved waveguide 76a has its output end connected with the input end of the straight waveguide 78a. That causes the waveguide to be extended in the lateral direction, i.e. rightward as viewed in the figure. The straight waveguide 78a has its output end connected with the input end of the curved waveguide 80a. That causes light to be bent clockwise through 90° over the curved waveguide 80a to propagate in the vertical direction, i.e. downward as viewed in the figure. The curved waveguide 80a has its output end connected with the input end of the straight waveguide 82a, which is formed correspondingly in length to the straight waveguide 74a. That causes the waveguide to be extended in the vertical direction, i.e. downward as viewed in the figure. The straight waveguide 82a functions as adjusting the geometric length.

The straight waveguide 82a has its output end connected with the input end of the straight waveguide 68a. Thus, the waveguide is further extended in the vertical direction, i.e. downward as viewed in the figure. The straight waveguide 68a has its output end connected with the input end of the curved waveguide 84a. That causes light to be bent counterclockwise through 90° over the curved waveguide 84a to propagate in the lateral direction, i.e. rightward as viewed in the figure. The curved waveguide 84a has its output end connected with the input end of the straight waveguide 86a. That causes the waveguide to be extended in the lateral direction, i.e. rightward as viewed in the figure, to be prevented from overlapping with the adjacent waveguide. The straight waveguide 86a has its output end connected with the output end of the connective waveguide 56a of the star coupler 44 on the boundary 42b.

The structural elements 62 and 64 will next be described. As described previously, the one structural element 62 has one set of straight waveguides 66a to 66f provided thereon. The structural element 62 has its sections which are disposed correspondingly to the respective straight waveguides 66a to 66f and each of which is different in geometric length from each other in the vertical direction so as to increase from outside to inside. Similarly, the other structural element 64 has the other set of straight waveguides 68a to 68f provided thereon. The structural element 64 has its sections which are disposed correspondingly to the respective straight waveguides 68a to 68f and each of which is different in geometric length from each other in the vertical direction such that the length is increased from outside to inside.

Between the regions where the structural elements 62 and 64 are formed and the remaining regions, the optical waveguide is also different in equivalent refractive index. Each of the optical waveguides 46a to 46f of the arrayed waveguide portion 46 in the AWG 40 has sections where the structural elements 62 and 64 are formed to serve as the adjustment sections for adjusting phase differences. Each of the optical waveguides has sections corresponding to the regions where no structural elements are formed to serve as the reference sections providing a reference. The reference sections have a geometric path length of L and the adjustment sections have a geometric path length of $L_a$. The reference sections have an equivalent refractive index of n, and the adjustment sections have an equivalent refractive index of $n_a$.

The geometric path length $L_a$ corresponds to the total length of the structural elements 62 and 64 in the direction of propagation of light. As described above, the geometric path lengths $L_a$ are set to different values between the optical waveguides 46a to 46f. Thus, between the optical waveguides 46a to 46f, the geometric path length L of the reference sections and the geometric path length $L_a$ of the adjustment sections are set to respective values different from each other.

In the AWG 40, the interference between two adjacent optical waveguides can be handled in the same way as in the case of Mach-Zehnder interferometer. Accordingly, in the AWG 40, the structures of the optical waveguides 46a to 46f are so designed that (1) a given phase difference is caused between two optical waves outputted from any two adjacent optical waveguides to attain a positive interference and that (2) the interference condition is not affected by temperature fluctuation and/or dimensional error.

More specifically, each of the optical waveguides 46a to 46f is designed in advance to have the equivalent refractive indices and geometric lengths of the optical waveguides in the reference and adjustment sections such as to satisfy the conditions (1) and (2) above, thereby implementing the AWG 40 which can achieve, in addition to, or instead of, the temperature independency, the insensitiveness of the wavelength characteristic to dimensional error, such as width or thickness deviation.

Between the reference and adjustment sections, a manner of contacting the cladding layer with the core, or a cladding material may be designed in common, and the width and/or thickness of the core forming the optical waveguides may be made different from each other, as may be the same as in the case of Mach-Zehnder interferometer.

Description will be made on the principle of operation and method of design of the AWG to which to the optical wavelength filter is applied in accordance with the invention. For simplification, description will be proceeded to on an AWG that is similar in structure to the AWG shown in FIG. 4 except for the number of waveguides. Therefore, in the following description, components may be identified by reference numerals shown in FIG. 4.

Interference of light occurs between two adjacent optical waveguides in the arrayed waveguide portion of the AWG and can be treated in the same way as a Mach-Zehnder interferometer. When the output from the Mach-Zehnder interferometer is maximized, an optical interference condition is given by $$\frac{2\pi \Delta l}{\lambda} = 2m\pi, \quad (1a)$$

where m is an integer, and the variable $\Delta l$ is the optical path difference required for a positive interference.

The output P from the AWG can be given by $$P = \left| \sum_q \exp\left\{ \left(\frac{2j\pi}{\lambda}\right) [qn_s d(\sin\Theta_{in} - \sin\Theta_{out}) + q\Delta l] \right\} \right|^2, \quad (1b)$$

where the variable q is any one of natural numbers 1 to N given to arrayed waveguides, $\lambda$ is the wavelength of light of interest, $n_s$ is the equivalent refractive index of the planar waveguide of a star coupler, and d is the spacing between the boundary 50ae of the planar waveguide of the one star coupler 42 and the boundary 50bs of the planar waveguide of the other star coupler 44.

The angles $\Theta_{in}$ and $\Theta_{out}$ are given by a tan $(x/L_s)$, when x is assumed to be the position at which the input waveguide 48 is mounted on the boundary 50 as and at which the output waveguide 60 is mounted on the boundary 50be. The value $L_s$ is the length of each planar waveguide of the star couplers 42 and 44 in the direction of the optical axis of the planar waveguide The variable $\Delta l$ is an optical length difference necessary for implementing the function of coupling and splitting optical waves.

The optical path difference $\Delta l$ is given by $$\Delta l = n\Delta L + n_a \Delta L_a. \quad (2)$$

By substituting Expression (2) into Expression (1), $$\frac{2\pi(n\Delta L + n_a \Delta L_a)}{\lambda} = 2m\pi \quad (2a)$$

is yielded.

In Expressions (2) and (2a), the optical path difference $\Delta L$ is a difference in geometric path length of a reference section between adjacent waveguides of a Mach-Zehnder interferometer or AWG. The optical path difference $\Delta L_a$ is a difference in geometric path length within an adjustment section. The refractive index n is an equivalent refractive index in a reference section. The refractive index $n_a$ is an equivalent refractive index in an adjustment section.

The dependency of the optical path difference $\Delta L$ on the width w of an optical waveguide is given by $$\frac{d(\Delta l)}{dw} = \left(\frac{dn}{dw}\right)\Delta L + \left(\frac{dn_a}{dw}\right)\Delta L_a. \quad (3)$$

In Expression (3), by setting parameters in the right side such that the left side $(d(\Delta l)/dw)$ becomes equal to zero, a Mach-Zehnder interferometer or AWG will be independent of width variations. Condition therefor is given by Expressions (2) and (3). As can be seen from this, the condition can be satisfied by the arrayed waveguide portion 46 having the region of each waveguide partitioned into two sections. That is, the arrayed waveguide portion 46 having each of the optical waveguides 46a to 46f divided into two sections, reference and adjustment sections, which have respective optical waveguides having the equivalent refractive index and geometric length set in advance to values fixed at a single wavelength 2, thereby implementing a Mach-Zehnder interferometer or AWG having its wavelength characteristics independent of width variations.

The variable m in Expression (1) has arbitrariness. Accordingly, in order to establish the value of the variable m, a further condition may be prepared. This condition is that the variable m is adjusted within the ranges of magnitude of optical path differences $\Delta L$ and $\Delta L_a$ such that the spacing between resonant frequencies, FSR, (Free Spectral Range), exceeds the operating wavelength range to render the variable m an integer at the wavelength $\lambda$.

When the FSR falls within the operating wavelength range, the arbitrariness of the variable m may cause light of the same wavelength to be outputted on different ports. In particular, it is then necessary to satisfy the condition given by $$\left| \pi(n_0 \Delta L + n_{a0} \Delta L_a) \frac{\Delta \lambda}{\Delta \lambda_0^2} \right| < \pi, \tag{4}$$

where the wavelength $\lambda_0$ is the center wavelength of the wavelength range, the refractive index $n_0$ is the equivalent refractive index in the reference section at the wavelength $\lambda_0$, and the refractive index $n_{a0}$ is the equivalent refractive index in the adjustment section at the wavelength $\lambda_0$.

The results of calculations of variations in the wavelength characteristics of the AWG will be described. In particular, the AWG was designed based on Expressions (2), (3) and (4), and variations in wavelength characteristic of the AWG were calculated based on Expression (1b). The results are illustrated in FIGS. 5 to 8.

The AWG used for the calculations is similar to the AWG shown in FIG. 4 except for the number of waveguides. Therefore, components may be indicated by symbols shown in FIG. 4. The parameters used in Expressions (2), (3) and (4) are used for the calculations. The AWG used for the calculations has one input waveguide, an output waveguide with sixteen ports, and an arrayed waveguide portion including sixty-four optical waveguides. The planar waveguides 50a and 50b in the star couplers 42 and 44 are 1,090 μm in length. The spacing d at the junction with the planar waveguide of the arrayed waveguide portion 46 is set to 2 μm.

The "variations in wavelength characteristic of the AWG" in FIGS. 5 to 8 are the dependency of wavelengths outputted from the output ports of the AWG. The vertical axis indicates the relative intensity of the output light when normalized with the maximum output. The horizontal axis indicates wavelengths in μm. As described later, there are sixteen output ports and there are wavelength characteristics corresponding to the sixteen output channels, ch1 to ch16. However, FIGS. 5 to 8 show the wavelength characteristics with respect to channels ch1, cha8 and ch16 corresponding to the minimum, center and maximum wavelengths, respectively.

Figure 5:
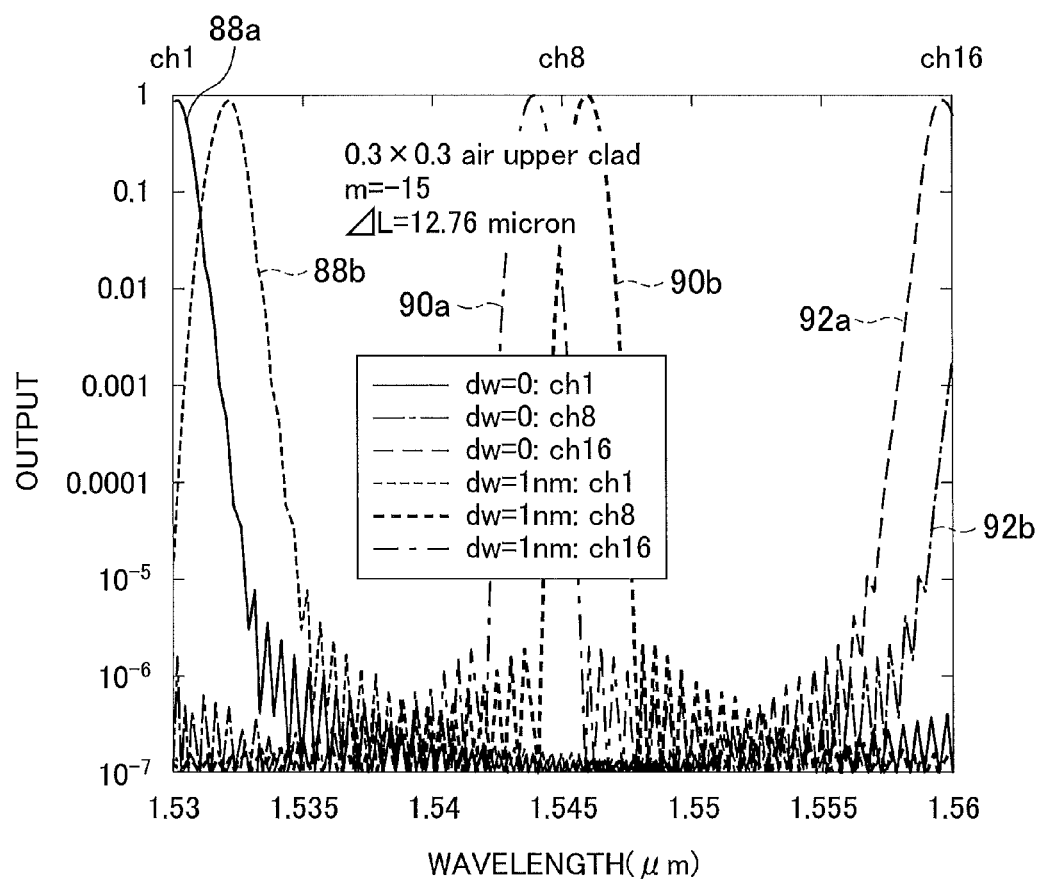
FIG. 5 is a graph for use in understanding variation in wavelength characteristic on a conventional AWG exhibiting deviation in width of optical waveguides.

FIG. 5 is a graph plotting variations in wavelength characteristic of the conventional AWG caused by a deviation in width of the optical waveguide. In the conventional AWG, wavelengths are not held "constant" against temperature fluctuations or fabrication errors but vary. The optical waveguide has its thickness of 300 nm and its width of 300 nm. The optical waveguide has its surfaces except its bottom surface, i.e. top and side surfaces, are in contact with the air. The interference order m=−15, and the optical path difference ΔL=12.76 μm. In this AWG, when there is no deviation in width, the wavelength characteristics on channels ch1, ch8 and ch16 are as indicated by solid line 88a, dot-and-dash line 90a and dotted line 92a, respectively. If the width of the optical waveguide increases by 1 nm to 301 nm, the wavelengths on the channels ch1, ch8 and ch16 vary to the wavelength characteristics indicated by dotted line 88b, thick broken line 90b and dot-and-dash line 92b, respectively. When observing the peaks, the peaks on the channels have shifted to the adjacent output channels. Accordingly, it was difficult to use the conventional AWG with a width deviation of 1 nm.

Figure 6:
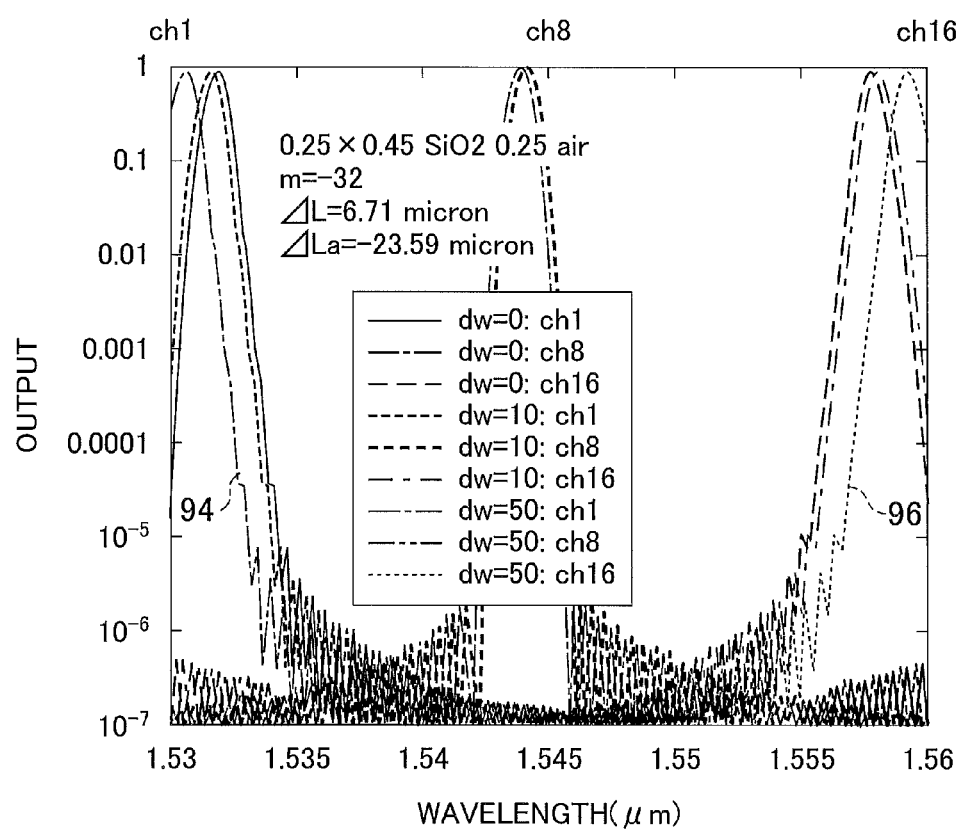
FIG. 6 is a graph, like FIG. 5, for use in understanding variation in wavelength characteristic caused by deviation in width of optical waveguides on an AWG employing an optical wavelength filter in accordance with the invention.

FIG. 6 shows variations in wavelength characteristic of the AWG according to the present invention, the variations being caused by a deviation in width of the optical waveguide. The AWG of this example has its center wavelength held constant against errors in width caused during fabrication. The optical waveguide has its thickness of 250 nm, and its width of 450 nm in the reference section and its width of 250 nm in the adjustment section. The optical waveguide in the reference section has its top, side and bottom surfaces being in contact with the cladding layer of SiO$_2$, and the optical waveguide in the adjustment section has its bottom surface being in contact with the cladding layer whereas its top and side surfaces are made contact with the air. The optical path difference ΔL in the reference section is 6.71 μm, and the optical path difference ΔL$_a$ in the adjustment section is −23.59 v. The order of interference m=−32. Because of this structure, the center wavelength can be held constant.

FIG. 6 shows the wavelength characteristics exhibited when, with respect to a designed waveguide width, there were no increase in width error dw=0 nm, an increase of 10 nm, i.e. width error dw=10 nm, and an increase of 50 nm, i.e. width error dw=50 nm. The results of the calculations show that the wavelength characteristics showed no significant variations on those channels ch1, ch8 and ch16 when the width error dw was 10 nm. The wavelength characteristic in the vicinity of the center wavelength on the channel ch8 showed no variations when the width error was 50 nm. In the AWG fabricated under the condition, however, the wavelengths at the both ends of the designed wavelength range, i.e. the wavelengths 94 and 96 on the channels ch1 and ch16, respectively, shifted more significantly than when the width deviation was zero nm and 10 nm.

However, it can be seen, from a comparison of the effects of the width deviation of 50 nm, that the above deviation in wavelength characteristic corresponds to the effects of the width deviation of 1 nm on the conventional structure shown in FIG. 5. In other words, the AWG of the present example exhibits a resistance characteristic to width deviation about 50 times as high as the conventional AWG.

Figure 7:
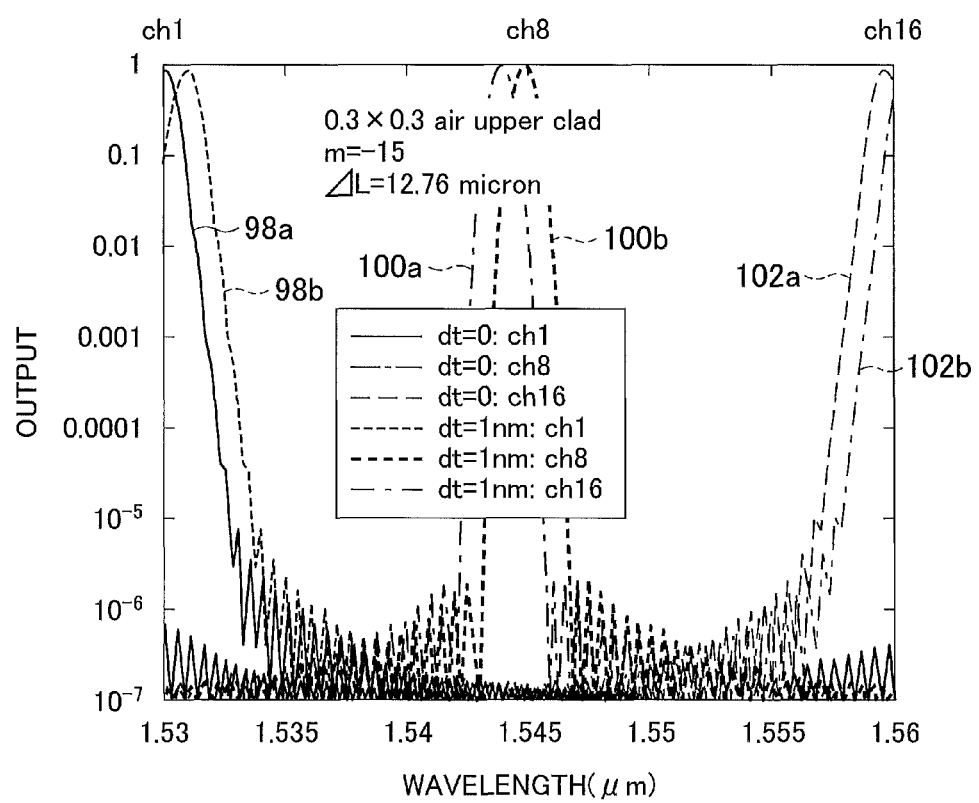
FIG. 7 is a graph, like FIG. 5, for use in understanding variation in wavelength characteristic on a conventional AWG having deviation in thickness of optical waveguides.

With the conventional AWG, variations in wavelength characteristic in response to a deviation in thickness of the optical waveguide are plotted in FIG. 7. In the conventional AWG, no wavelengths are held constant against temperature fluctuations and fabrication errors. The optical waveguide is identical in structural factor such as dimensions with the AWG corresponding to FIG. 5. In this conventional AWG, if there is no deviation in thickness, the wavelengths on channels ch1, ch8 and ch16 involve wavelength characteristics indicated by solid line 98a, dot-and-dash line 100a and broken line 102a, respectively. If the thickness of the optical waveguide increases by 1 nm to 301 nm, the wavelengths on the channels ch1, ch8 and ch16 varied to wavelength characteristics indicated by dotted line 98b, bold dotted line 100b and broken line 102b, respectively. Paying attention to the peaks, it is seen that the peaks on the channels have shifted to the adjacent output channels. It was thus difficult to use the conventional AWG even when the width deviates by 1 nm.

Figure 8:
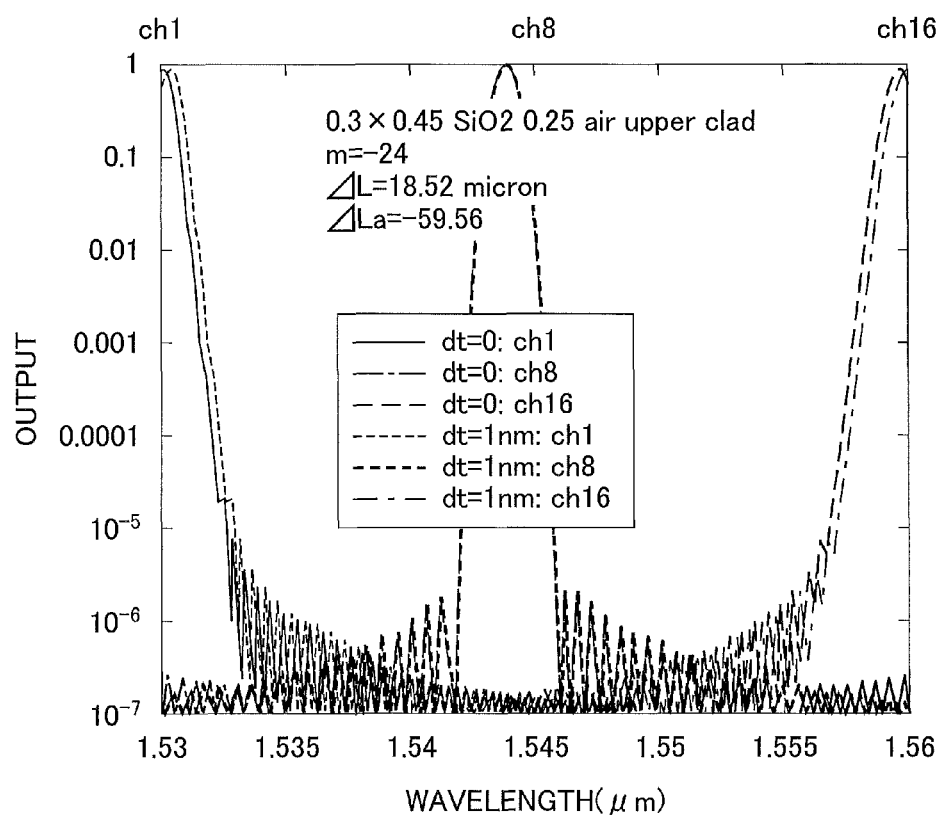
FIG. 8 is a graph, like FIG. 5, for use in understanding variation in wavelength characteristic caused by deviation in thickness of optical waveguides on an AWG employing an optical wavelength filter in accordance with the invention.

With the AWG to which the present invention is applied, variations in wavelength characteristic caused by a deviation in thickness of the optical waveguide are plotted in FIG. 8. In the AWG of the present embodiment, the center wavelength is held constant against thickness errors introduced during fabrication. The optical waveguide has its thickness of 250 nm, and its width of 450 nm in the reference section and its width of 250 nm in the adjustment section. The optical waveguide in the reference section has its top, side and bottom surfaces being in contact with the cladding layer of SiO$_2$, and the optical waveguide in the adjustment section has its bottom surface being in contact with the cladding layer whereas its top and side surfaces are in contact with the air. The optical path difference ΔL in the reference section is 18.52 m. The optical path difference ΔL$_a$ in the adjustment section is −59.56 μm. The order of interference m=−24. Because of this structure, the center wavelength can be held constant.

FIG. 8 shows the wavelength characteristics exhibited when, with respect to a designed waveguide thickness, there were no increase in width, i.e. width error dt=0 nm, and an increase of 1 nm, i.e. thickness error dt=1 nm. The results of the calculations demonstrate that the wavelength characteristics showed no significant variations on any of the channels when the thickness error dt was 1 nm. When the thickness error was 3 nm, although not illustrated, the characteristic on the channel ch8 in the vicinity of the center wavelength did not vary. It is confirmed, however, that the AWG fabricated under the condition characteristic involves deviations greater at the wavelengths on the opposite ends of the designed wavelength range, i.e. on the channels ch1 and ch16, than in the cases of the thickness deviations of 0 nm and 1 nm.

It can be seen, from a comparison of the effects of the thickness deviation of 3 nm, that the above deviation in wavelength characteristic corresponds to the effects of the thickness deviation of 1 nm on the conventional structure shown in FIG. 6. In other words, the AWG of the present embodiment exhibits a resistance characteristic to thickness deviation approximately three times as high as the conventional AWG.

An alternative embodiment to which an optical wavelength filter in accordance with the present invention is applied will be described. In accordance with the alternative embodiment, the optical wavelength filter has a reference section providing a reference and plural optical waveguides, each of which is partitioned into first and second adjustment sections for adjustment of a phase difference. That is, the optical wavelength filter of the instant alternative embodiment relies upon a three-region method in which each optical waveguide has three regions different in structure from each other.

The principle of operation of the optical wavelength filter of the alternative embodiment will first be described. As the optical wavelength filter, use is made of an AWG having one input port and seven output ports. The optical wavelength filter based on the two-region method is shown in FIG. 1A. The operation of the optical wavelength filter based on the three-region method in accordance with the alternative embodiment will conceptually be described with reference to FIGS. 9A and 9B. In the figures, the vertical axis indicates the relative intensity of the output light and the horizontal axis indicates the wavelength of the output light.

The AWG has seven output ports which provide outputs of different wavelengths of light of the same magnitude. The AWG is so designed that wavelengths $\lambda_1$ to $\lambda_7$ of light are outputted from the seven output ports, respectively, at a predetermined operating temperature. Two adjacent waves of light outputted from respective, two optical waveguides have a given phase difference therebetween. As a result of positive interference between two optical waves with the given phase difference therebetween, the output ports output the respective wavelengths $\lambda_1$ to $\lambda_7$ of light. The wavelength $\lambda_4$ is the center wavelength of the operating wavelength range. The wavelengths $\lambda_1$ and $\lambda_7$ are the wavelengths at the opposite ends of the operating wavelength range, i.e. minimum wavelength $\lambda_1$ and maximum wavelength $\lambda_7$.

In the AWG 40 of the previous embodiment shown in and described with reference to FIG. 1A, the center wavelength $\lambda_4$ is set to be held constant against temperature fluctuation and/or dimensional error, such as width and thickness deviations, caused when the optical waveguide is fabricated. Accordingly, the wavelength characteristic at the center wavelength $\lambda_4$ indicated by the bold solid line 10 substantially agrees with the wavelength characteristic indicated by the bold dotted line 12. This indicates that the wavelength characteristic on the output port corresponding to the wavelength $\lambda_4$ prior to temperature fluctuating agrees with the wavelength characteristic on the output port corresponding to the wavelength $\lambda_4$ after temperature having fluctuated. The opposite ends of the operating wavelength range correspond to the wavelengths $\lambda_1$ and $\lambda_7$, respectively. As long as the output ports corresponding to those wavelengths are within a tolerable range of temperature fluctuation, those wavelength characteristics hardly deviate.

As described earlier, the wavelength characteristic of the AWG in the previous embodiment is held constant against temperature fluctuation at the center wavelength $\lambda_4$ and thus has temperature independency, namely, the wavelength characteristic is not sensitive to temperature fluctuation. Furthermore, the wavelength characteristic of the AWG of the previous embodiment is held constant against fabrication error at the center wavelength $\lambda_4$ to thereby attain an AWG independent of width and thickness deviations, i.e. the wavelength characteristic is not affected by width and thickness deviations.

In the AWG according to the previous embodiment, however, if a temperature fluctuation exceeds its tolerable range, on the output ports corresponding to the opposite ends of the operating wavelength range, i.e. minimum wavelength $\lambda_1$ and maximum wavelength $\lambda_7$, the wavelength characteristics prior to the temperature fluctuation as indicated by thin solid lines 104a and 104b, respectively, deviate, as shown in FIG. 9A, to wavelength characteristics exhibited after the temperature fluctuation as indicated by thin dotted lines 106a and 106b, respectively.

In contrast, in the AWG of the alternative embodiment, as shown in FIG. 9B, the wavelengths $\lambda_1$ and $\lambda_7$ at the opposite ends of the operating wavelength range are held constant against temperature fluctuation and/or dimensional error, such as width or thickness deviation, caused in fabricating the optical waveguide. Accordingly, on the output ports corresponding to the wavelengths $\lambda$ and $\lambda_7$ at the opposite ends of the operating wavelength range, the wavelength characteristics substantially agree with the wavelength characteristics 104a and 104b exhibited before and after the temperature fluctuation. At the center wavelength $\lambda_4$ also, the wavelength characteristic on the output port corresponding to the wavelength $\lambda_4$ is almost unchangeable before and after the temperature fluctuation.

In the AWG of the alternative embodiment, since the wavelength characteristics at the two wavelengths, i.e. the minimum wavelength $\lambda_1$ and maximum wavelength $\lambda_7$, are held constant against temperature fluctuations in this way, the wavelength characteristic of the AWG is thus independent of temperature fluctuation. That is, by fixing the opposite ends of the set optical wavelength range, the intermediate wavelengths therebetween have less temperature dependency so that variation in wavelength characteristic caused by temperature fluctuation can be reduced or minimized over the whole operating wavelength range. In the AWG of the alternative embodiment, the wavelength characteristics at the two wavelengths, i.e. the minimum wavelength $\lambda_1$ and maximum wavelength $\lambda_7$, are held constant against fabrication error. Hence, it is possible to obtain an AWG insensitive to width and/or thickness deviations, i.e. the wavelength characteristic is not affected by width and/or thickness deviations. Additionally, in the AWG of the alternative embodiment, the minimum and maximum wavelengths are fixed. However, so far as it has two wavelengths fixed, wavelengths in the operating wavelength range other than the minimum and maximum wavelengths may be fixed.

As described earlier, the structure of an optical waveguide relies upon its equivalent refractive index and geometric length. In the alternative embodiment, each of optical waveguides is divided into three sections, i.e. a reference section, and a first and a second adjustment section. For each of the optical waveguides, the equivalent refractive index and geometric length of the optical waveguide are set in advance section by section. The alternative embodiment is different in optical waveguide structure from the previous embodiment in that each optical waveguide is divided into three sections whereas the previous embodiment has each optical waveguide divided into two sections. In accordance with the alternative embodiment, in order to fix the wavelength characteristic at two wavelengths, the AWG has the structure such that each optical waveguide is divided into three sections. Increase of the number of sections different in structure from each other causes the number of controllable parameters to increase.

In the same way as in the illustrative embodiment shown in and described with reference to FIGS. 1A and 1B, the structure of the optical waveguides of the AWG is designed such that, at both the minimum wavelength $\lambda_1$ and the maximum wavelength $\lambda_7$, both temperature fluctuation and dimensional error do not affect the interference condition, thereby simultaneously accomplishing insensitiveness to plural factors, i.e. insensitiveness to temperature fluctuation and width or thickness deviation, or to temperature fluctuation and width and thickness deviations.

One example of Mach-Zehnder interferometer based on a three-region method to which an optical wavelength filter in accordance with the present invention is applied will be described. A Mach-Zehnder interferometer is an optical wavelength filter, as described earlier, which receives input light of two multiplexed wavelengths different from each other and separates them to output. The Mach-Zehnder interferometer, 110, of the alternative embodiment will be described by referring to a schematic, perspective view of FIG. 10A and a view of vertical end surface of FIG. 10B cut along and viewed from the arrowed line XB-XB in FIG. 10A.

As described previously, the Mach-Zehnder interferometer 20 of the previous embodiment has components 28a and 28b of the upper cladding layer provided, as shown in FIGS. 2A and 2B, in order to introduce the adjustment section for adjusting the phase difference. The Mach-Zehnder interferometer 110 of the alternative embodiment includes partial waveguides 112a and 112b in addition to those components of the illustrative embodiment shown in FIGS. 2A and 2B. Of course, like components are indicated by the same reference numerals and their description will not be repeated.

Figure 10A:
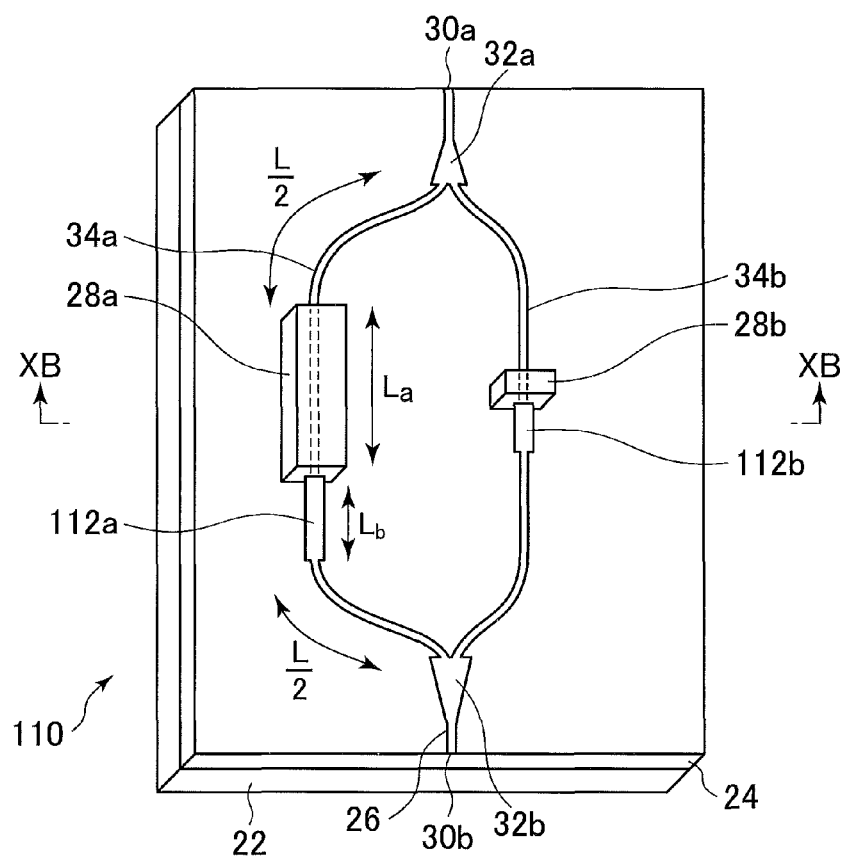
FIG. 10A is a schematic perspective view, like FIG. 2A, of an alternative embodiment of Mach-Zehnder interferometer to which applied is an optical wavelength filter in accordance with the invention.
Figure 10B:
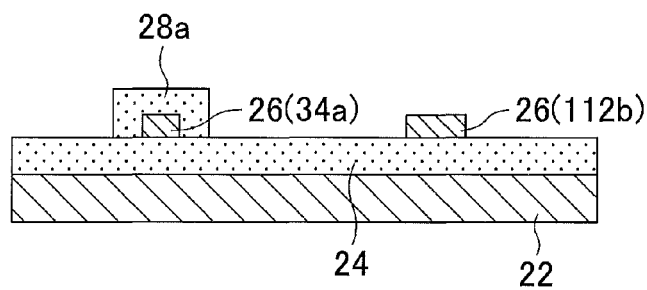
FIG. 10B shows an end surface, like FIG. 2B, of the Mach-Zehnder interferometer cut along and viewed from an arrowed line XB-XB shown in FIG. 10A.

The optical waveguide core 26 of the alternative embodiment includes partial waveguides 112a and 112b which are different in width as shown in FIGS. 10A and 10B. The partial waveguides 112a and 112b are formed thicker in width than the connective waveguides 34a and 34b shown in FIG. 2A.

The partial waveguides 112a and 112b may be made thinner in width than the connective waveguides 34a and 34b. The partial waveguides 112a and 112b are formed as inserted in the connective waveguides 34a and 34b in regions other than the region where the upper cladding layer components 28a and 28b are formed. In the example of FIG. 10A, the partial waveguides 112a and 112b are arranged adjacent to, and downstream in the direction of propagation of light with respect to, the region where the upper cladding layer components 28a and 28b are formed.

In the previous embodiment, the adjustment section is set as a section of an optical waveguide corresponding to the region where the upper cladding layer components 28a and 28b are formed to adjust the phase difference. In the instant alternative embodiment, that section is set as a first adjustment section while a second adjustment section is set as a section of an optical waveguide corresponding to the region where the partial waveguides 112a and 112b are formed for adjusting the phase difference. A reference section providing a reference is defined as a section of the optical waveguide corresponding to a region other than the region of the first and second adjustment sections.

For example, the geometric path length of the reference section is given by $L=L/2+L/2$, because of the presence of the connective waveguide 34a. The geometric path length of the first adjustment section is $L_a$, and the geometric path length of the second adjustment section is $L_b$. The geometric path length $L_a$ corresponds to the length of the upper cladding layer components 28a and 28b in the direction of propagation of light. The geometric path length $L_b$ corresponds to the length of the partial waveguide 112a in the direction of propagation of light. The equivalent refractive index in the reference section is n. The equivalent refractive index in the first adjustment section is $n_a$, and the equivalent refractive index in the second adjustment section is $n_b$.

Similarly to the "principle of operation of an optical wavelength filter" as described in connection with the previous embodiment, the connective waveguides 34a and 34b of the alternative embodiment has the optical waveguide structure thereof so designed that (1) a given phase difference is caused between two waves of light outputted to attain a positive interference and that (2) the interference condition is not affected by temperature fluctuation and/or dimensional error.

More specifically, each of the connective waveguides 34a and 34b is designed in advance to have the equivalent refractive index and geometric length of the optical waveguides in those three sections, reference section and first and second adjustment sections so as to satisfy the conditions (1) and (2) above, thereby implementing the Mach-Zehnder interferometer 110 which can not only enhance its temperature independency but also reduce its dependency upon width or thickness deviation, namely, the insensitiveness to dimensional error can be enhanced. A specific method of design will be described later.

An example of configuration of a Mach-Zehnder interferometer to which an optical wavelength filter of the present invention is applied will next be described by referring to FIGS. 11A and 11B. The example of Mach-Zehnder interferometer 110 may be similar to the Mach-Zehnder interferometer shown in FIGS. 10A and 10B except for how the upper cladding layer is formed. Like components are of course indicated by the same reference numerals and their repetitive description is omitted.

Figure 11A:
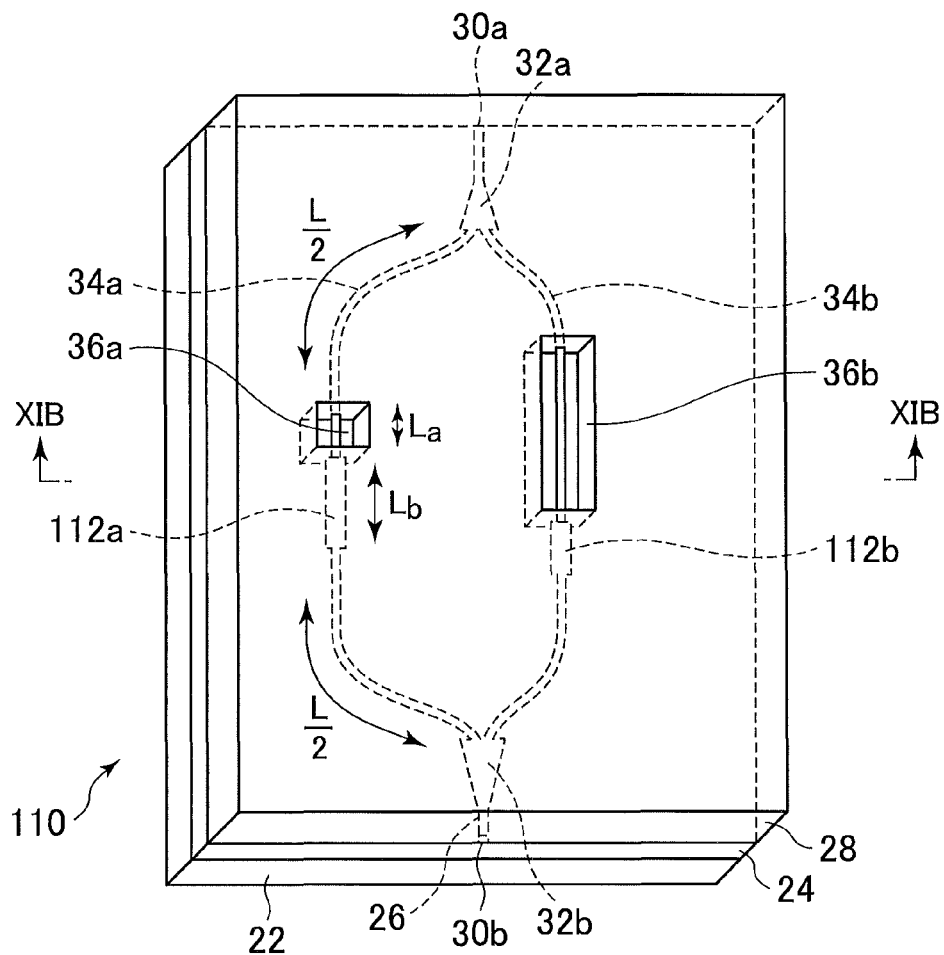
FIG. 11A is a schematic perspective view, like FIG. 2A, of another, exemplified structure of the Mach-Zehnder interferometer in accordance with the alternative embodiment.
Figure 11B:
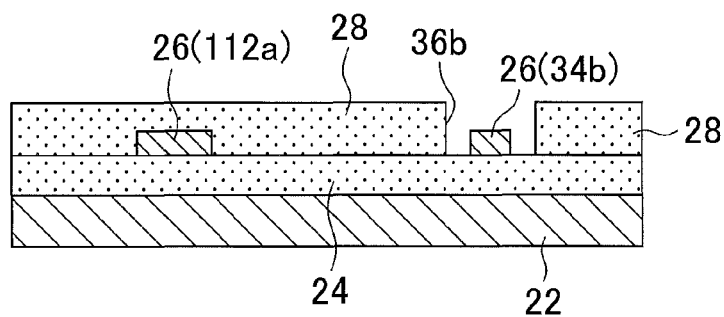
FIG. 11B shows an end surface, like FIG. 2B, of the Mach-Zehnder interferometer cut along and viewed from an arrowed line XIB-XIB shown in FIG. 11A.

The Mach-Zehnder interferometer 110 shown in FIGS. 11A and 11B has openings 36a and 36b which are formed by partially removing the upper cladding layer 28 for the purpose of introducing the adjustment section for adjustment of the phase difference as in the example shown in FIGS. 3A and 3B. The Mach-Zehnder interferometer 110 includes components, i.e. partial waveguides 112a and 112b, in addition to the components shown in FIGS. 10A and 10B. The Mach-Zehnder interferometer 110 of that example may be similar in structure to the example shown in FIGS. 3A and 3B except for those components thus mentioned.

The optical waveguide core 26 of the alternative embodiment includes the partial waveguides 112a and 112b which are different in width from the remaining portions. The partial waveguides 112a and 112b shown in FIG. 10A are formed thicker in width than the connective waveguides 34a and 34b. The partial waveguides 112a and 112b are formed as inserted in the connective waveguides 34a and 34b in a region other than the region where the openings 36a and 36b are formed. Specifically, in the example shown in FIG. 10A, the partial waveguides 112a and 112b are arranged adjacent to, and downstream in the direction of propagation of light with respect to, the region where the openings 36a and 36b are formed.

With the previous, illustrative embodiment, the adjustment section is set as an optical waveguide section corresponding to the region where the openings 36a and 36b are formed to adjust the phase difference. In the alternative embodiment, this adjustment section is set as the first adjustment section while the second adjustment section is set as an optical waveguide section corresponding to the region where the partial waveguides 112a and 112b are formed to adjust the phase difference. The reference section providing a reference is a section of the optical waveguide corresponding to a region other than those regions.

The Mach-Zehnder interferometer 110 shown in FIGS. 11A and 11B is provided with the connective waveguides 34a and 34b, each of which includes a reference section, and first and second adjustment sections that have the equivalent refractive index and geometric length of the optical waveguide set in advance so as to satisfy the above-described conditions (1) and (2), thereby enhancing, in addition to, or in place of, its temperature independency, its insensitiveness to dimensional error, such as width or thickness deviation.

The Mach-Zehnder interferometer 110 shown in FIGS. 11A and 11B has the optical waveguide core 26 that is coated with the upper cladding layer 28 in the region where the openings 36a and 36b are not formed. Therefore, the difference in refractive index between the optical waveguide core 26 and the cladding layer is smaller than in the case of interferometer shown in FIGS. 10A and 10B. Consequently, the interferometer 110 can suppress scattering loss of light.

The two kinds of Mach-Zehnder interferometer 110 described above have the first and second adjustment sections which are different in width of the core forming the optical waveguide. Alternatively, the core width may be made common between the first and second adjustment sections whereas both sections may be made different in how the cladding layer is in contact with the core, in core thickness, or in cladding material. Such differences can vary the equivalent refractive index of the optical waveguide.

An illustrative embodiment of an AWG based on the 3-region method to which an optical wavelength filter in accordance with the invention is applied will be described by referring to FIG. 12. In the AWG 40 shown in and described with reference to FIG. 4, in order to introduce an adjustment section for adjusting the phase difference, there are included the structural element 62 having the set of straight waveguides 66a to 66f and the structural element 64 having the other set of straight waveguides 68a to 68f. The AWG 120 of the alternative embodiment includes, in addition to the components of the AWG 40 of the previous embodiment, partial waveguides 122a to 122f and 124a to 124f which are provided in the optical waveguide core 26 and different in width from other waveguides. The AWG 120 may include the same components except those additional components. Like components are indicated by the same reference numerals, and their repetitive description is omitted.

The one structural element 62 has its geometric length in the vertical direction in the figure increasing in the order of the straight waveguides 66a to 66f, that is, from outside to inside.

In the present alternative embodiment, the one set of partial waveguides 122a to 122f is formed thicker in width than the straight waveguides 66a to 66f. The partial waveguides 122a to 122f may not be restricted to this structure. Alternatively, the partial waveguides 122a to 122f may be made thinner in width than the straight waveguides 66a to 66f. Furthermore, the partial waveguides 122a to 122f are formed as inserted between the corresponding straight waveguides 66a to 66f and the corresponding straight waveguides 74a to 74f in regions other than the region where the structural element 62 is formed. The geometric lengths in the vertical direction are reduced in the order of the partial waveguides 122a to 122f, i.e. from outside to inside. The partial waveguides 122a to 122f are disposed adjacent to, and downstream in the direction of propagation of light with respect to, the region where the structural element 62 is formed.

The other set of straight waveguides 124a to 124f has the vertical geometric lengths thereof increased in this order, i.e. from outside to inside.

With the instant alternative embodiment, the partial waveguides 124a to 124f are formed thicker in width than the straight waveguides 68a to 68f. The partial waveguides 124a to 124f may not be restricted to this structure. Alternatively, the partial waveguides may be made thinner in width than the straight waveguides 68a to 68f. The partial waveguides 124a to 124f are formed as inserted between the corresponding straight waveguides 68a to 68f and the corresponding straight waveguides 82a to 82f in regions other than the region where the structural element 64 is formed. Their vertical geometric lengths are made shorter in the order of the partial waveguides 124a to 124f, i.e. from outside to inside. The partial waveguides 124a to 124f are disposed adjacent to, and upstream in the direction of propagation of light with respect to, the region where the structural element 64 is formed.

In the current alternative embodiment, the AWG 120 has a first adjustment section in which the optical waveguides corresponding to the region where the structural elements 62 and 64 are formed adjust the phase difference and a second adjustment section in which the optical waveguides corresponding to the region where the partial waveguides 122a to 122f and 124a to 124f are formed adjust the phase difference. In the AWG 120, the optical waveguides in the section corresponding to the remaining region are reference sections for providing a reference. The reference sections have a geometric path length of L. The first and second adjustment sections have geometric path lengths of $L_a$ and $L_b$, respectively.

The geometric path length $L_a$ is the total length of the sections corresponding to the structural elements 62 and 64 in the direction of propagation of light. As described previously, the structural elements 62 and 64 have the geometric lengths thereof different between the optical waveguides 46a to 46f. The geometric path length $L_b$ corresponds to the total length of either one of the partial waveguides 122a to 122f and corresponding one of the partial waveguides 124a to 124f. For example, the geometric path length $L_b$ of the optical waveguide 46a corresponds to the sum of the lengths of the partial waveguides 122a and 124a. As described above also, the structural elements 62 and 64, and the partial waveguides 122a to 122f and 124a to 124f are made different in geometric path length between the optical waveguides 46a to 46f. Accordingly, the optical waveguides 46a to 46f are different from each other in geometric lengths L, $L_a$ and $L_b$ of the reference, first adjustment and second adjustment sections, respectively.

Interference between optical waveguides adjacent to each other in an AWG can be treated in the same way as a Mach-Zehnder interferometer. Therefore, as stated earlier, the optical waveguides 46a to 46f of the AWG are so designed that (1) a given phase difference is caused between two waves of light outputted from any two optical waveguides adjacent to each other to attain a positive interference and that (2) the interference condition is not affected by temperature fluctuation and/or dimensional error.

More specifically, each of the optical waveguides 46a to 46f is designed in advance to have the equivalent refractive indices and geometric lengths of the optical waveguides in the reference section, the equivalent refractive indices and geometric lengths of the optical waveguides in the first adjustment section, and the equivalent refractive indices and geometric lengths of the optical waveguides in the second adjustment section so as to satisfy the conditions (1) and (2), whereby the AWG also can enhance the insensitiveness to dimensional error, in addition to, or in place of, the temperature independency. Enhancing the insensitiveness to dimensional error means decreasing the dependency on width or thickness deviation.

The principle of operation and method of design of the AWG according to the alternative embodiment will now be described. This AWG 120 may be similar in structure to the structure shown in FIG. 12 except for the number of waveguides. In the following description again, like components may be identified by the same reference numerals as used in FIG. 12.

With the Mach-Zehnder interferometer or AWG in the previous, illustrative embodiment shown in and described with reference to FIG. 4, the condition is presented which does not cause variation in width to affect variation in wavelength characteristic. According to the previous description, the presented condition is given by two Expressions (2) and (3), and the condition can therefore be satisfied if there are two regions. Specifically, in the previous embodiment, the insensitiveness of the Mach-Zehnder interferometer or AWG to width variation can be achieved by dividing each optical waveguide into two sections; reference and adjustment sections, and setting beforehand the equivalent refractive index and geometric length of the optical waveguide in each section so as to fix the wave characteristic at a single wavelength $\lambda$. Furthermore, it was also described previously that the condition given by Expression (4) is added in order to determine the value of the variable m.

In the AWG of the alternative embodiment, in order to hold constant the wavelength characteristic at two wavelengths, each of the optical waveguides is divided into three sections; a reference, a first adjustment and a second adjustment section, and the equivalent refractive index and geometric length of optical waveguide are set in advance for each section. Controllable parameters are thus increased, and, as a result, the AWG requires more complex calculations in order to obtain the independency or insensitiveness of the wavelength characteristic to variation.

Now, the two wavelengths at the opposite ends of the wavelength range are assumed to be $\lambda_e$ and $\lambda_f$. The geometric path length of the reference section is set to L. The geometric path lengths of the first and second adjustment sections are set to $L_a$ and $L_b$, respectively. At the two wavelengths $\lambda_e$ and $\lambda_f$ thus assumed, the equivalent refractive indices in the reference section re set to $n_e$ and $n_f$ respectively, while the equivalent refractive indices in the first adjustment section are set to $n_{ae}$ and $n_{af}$ and the equivalent refractive indices in the second adjustment section are set to $n_{be}$ and $n_{bf}$ respectively. Moreover, after the wavelength characteristic has varied, at the wavelengths assumed above, the equivalent refractive indices in the reference section are set to $n'_e$ and $n'_f$ respectively, while the equivalent refractive indices in the first adjustment section are set to $n'_{ae}$ and $n'_{af}$ and the equivalent refractive indices in the second adjustment section are set to $n'_{be}$ and $n'_{bf}$ respectively.

Under those assumptions, rewriting Expression (2) gives rise to Expressions (4a) to (4d).

$$\frac{2\pi\{n_{sf}d(\sin\Theta_{in} - \sin\Theta_{fout}) + n_f \Delta L + n_{af}\Delta L_a + n_{bf}\Delta L_b\}}{\lambda_f} = 2m\pi \quad (4a)$$

$$\frac{2\pi\{n_{se}d(\sin\Theta_{in} - \sin\Theta_{eout}) + n_e \Delta L + n_{ae}\Delta L_a + n_{be}\Delta L_b\}}{\lambda_e} = 2m''\pi \quad (4b)$$

$$\frac{2\pi\{n'_{sf}d(\sin\Theta_{in} - \sin\Theta_{fout}) + n'_f \Delta L + n'_{af}\Delta L_a + n'_{bf}\Delta L_b\}}{\lambda_f} = 2m\pi \quad (4c)$$

$$\frac{2\pi\{n'_{se}d(\sin\Theta_{in} - \sin\Theta_{eout}) + n'_e \Delta L + n'_{ae}\Delta L_a + n'_{be}\Delta L_b\}}{\lambda_e} = 2m''\pi \quad (4d)$$

With a Mach.-Zehnder interferometer, the terms d (sin $\Theta_{in}$–sin $\Theta_{eout}$) and d (sin $\Theta_{in}$–sin $\Theta_{fout}$) in Expressions (4a) to (4d) may be set to zero. For an AWG, it is customary that the order m may be set to m''', so that different FSR peaks are not caused in the operating wavelength range.

In order to prevent the same wavelength from being outputted on different ports, Expression (4) defining the value of the order m is rewritten into $$\left| \pi(n_{0g}\Delta L + n_{a0g}\Delta L_a + n_{b0g}\Delta L_b)\frac{\Delta\lambda}{\Delta\lambda_0^2} \right| < \pi, \quad (5)$$

where $\lambda_0$ is the center wavelength of the wavelength range, and the refractive index $n_{i0g}$ is the group refractive index of a region i.

Specifically, the refractive index $n_{0g}$ is the group refractive index in the reference section at the wavelength $\lambda_0$. The refractive index $n_{a0g}$ is the group refractive index in the first adjustment section at the wavelength $\lambda_0$. The refractive index $n_{b0g}$ is the group refractive index in the second adjustment section at the wavelength $\lambda_0$.

First, the terms d (sin $\Theta_{in}$–sin $\Theta_{eout}$) and d (sin $\Theta_{in}$–sin $\Theta_{fout}$) are deleted from Expressions (4a) to (4d). Then, the geometric path length differences $\Delta L_a$ and $\Delta L_b$ are found as values represented by $\Delta L$. The found values are substituted into Expression (5) to determine the value of the geometric path length difference $\Delta L$. The value $\Delta\lambda$ in Expression (5) is adjusted so that the order m in Expression (4) assumes an integral value, thus the value of the geometric path length difference $\Delta L$ being uniquely determined. After obtaining the geometric path length difference $\Delta L$, Expression (4) is used to determine the terms d (sin $\Theta_{in}$–sin $\Theta_{eout}$) and d (sin $\Theta_{in}$–sin $\Theta_{fout}$).

Specifically, from Expressions (4a) to (4d), the following Expressions $$\frac{\Delta L_a}{\Delta L} = \frac{\begin{vmatrix} (\Delta n_e + \Delta n_f)(\chi'\delta n_b - \chi\delta n'_b) - \\ (\Delta n_{be} + \Delta n_{bf})(\chi'\delta n - \chi\delta n') \end{vmatrix}}{\begin{bmatrix} (\Delta n_{ae} + \Delta n_{af})(\chi'\delta n_b - \chi\delta n'_b) - \\ (\Delta n_{be} + \Delta n_{bf})(\chi'\delta n_a - \chi\delta n'_a) \end{bmatrix}} \quad (6a)$$

$$\frac{\Delta L_b}{\Delta L} = \frac{\left[ -(\Delta n_e + \Delta n_f) - (\Delta n_{ae} + \Delta n_{af})\left(\frac{\Delta L_a}{\Delta L}\right) \right]}{(\Delta n_{be} + \Delta n_{bf})} \quad (6b)$$

$$\Delta n_{ij} = n_{ij} - n'_{ij} \quad (6c)$$

$$\delta n_i = \frac{n_{ie}}{\lambda_e} + \frac{n_{if}}{\lambda_f} \quad (6d)$$

-continued $$\delta n'_i = \frac{n'_{ie}}{\lambda_e} + \frac{n'_{if}}{\lambda_f} \quad (6e)$$

$$\chi' = \frac{n'_{se}}{\lambda_e} + \frac{n'_{sf}}{\lambda_f} \quad (6f)$$

$$\chi = \frac{n_{se}}{\lambda_e} + \frac{n_{sf}}{\lambda_f} \quad (6g)$$

are obtained.

In addition, from Expression (5), Expression $$\Delta L = \frac{a\lambda_0^2}{\Delta\lambda\left(n_{0g} + n_{a0g}\frac{\Delta L_a}{\Delta L} + n_{b0g}\frac{\Delta L_b}{\Delta L}\right)} \quad (7)$$

is derived.

In Expression (7), the relation $|a|<1$ or $|a|<\Delta\lambda$ is set. Alternatively, the terms d (sin $\Theta_{in}$–sin $\Theta_{eout}$) and d (sin $\Theta_{in}$–sin $\Theta_{fout}$) are adjusted so as to render the order m of Expressions (4a) to (4d) assume an integral value.

By subtracting Expression (4b) from Expression (4a), the value of the term (sin $\Theta_{fout}$–sin $\Theta_{eout}$) is obtained as a formula independent of the order m. The spacing between the output ports is determined based on the result.

The forms of Expressions (6a) to (6g), and Expression (7) vary depending on which parameter is deleted. In the presently presented Expressions (6a) to (6g), and Expression (7), variations in width and thickness can be calculated using the same formula. Therefore, when the width varies, the difference in equivalent refractive index, i.e. the term (n'$_{se}$–n$_{se}$) becomes null. In addition, the deletion of the term (n'$_{se}$–n$_{se}$) during the process of deriving the formulas prevents the term (n'$_{se}$–n$_{se}$) from appearing in the denominators.

For a Mach-Zehnder interferometer, Expression (6a) can be replaced by Expression $$\frac{\Delta L_a}{\Delta L} = -\frac{(\Delta n_{bf}\Delta n_e - \Delta n_{be}\Delta n_f)}{(\Delta n_{bf}\Delta n_{ae} - \Delta n_{be}\Delta n_{af})}. \quad (6h)$$

Expression (6h) can be used also for an AWG.

Expressions (6a) to (6g), and Expression (7) are expressed in the same format. Instead of Expression (5), for example, the difference between Expressions (4a) and (4b) is calculated to obtain Expression $$(n_a-n_f)\Delta L + (n_{ae}-n_{af})\Delta L_a + (n_{be}-n_{bf})\Delta L_b = \lambda_e m'' - \lambda_f m. \quad (8)$$

Expression (8) is used because, with an AWG, there are plural wavelengths to be selected by the filter.

Assuming a wavelength difference $\Delta\lambda$ to be FSR, it follows that $\Delta\lambda = (\lambda_e - \lambda_f)/(m''-m)$. The order m" has the relationship m"=m+1. From this formula, Expression (7) in which an assumption $|a|=1$ is made is approximately derived. When adjusting the wavelength difference $\Delta\lambda$, an adjustment is made such that the orders m in Expressions (4a) to (4d) assume integral values, whereby the wavelength in each channel is adjusted.

The results of calculating variations in wavelength characteristic of the AWG will next be described. In particular, the AWG was designed based on Expressions (6a) to (6g), and Expression (7). Variations in the wavelength characteristic of the AWG were calculated based on Expression (1b). The results are illustrated in FIGS. 13, 14 and 15.

Figure 12:
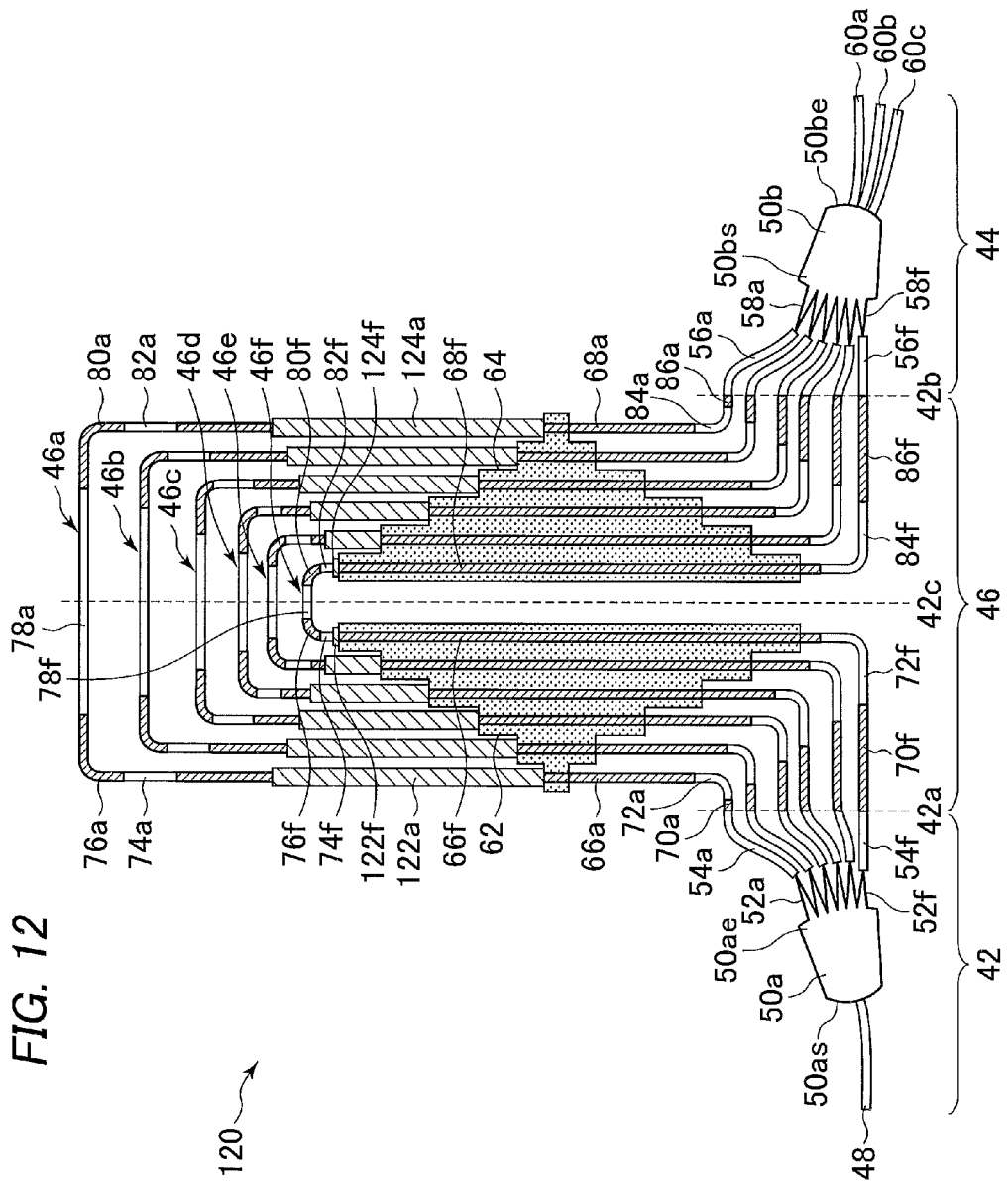
FIG. 12 is a plan view, like FIG. 4, schematically showing the configuration of an AWG to which applied is an optical wavelength filter in accordance with the alternative embodiment.

The AWG used for the calculations may be similar to an AWG fabricated with the structure shown in FIG. 12 except for the number of waveguides. Again, like components are indicated by reference numerals used in FIG. 12. The parameters used in Expressions (6a) to (6g), and Expression (7) are used. The AWG for use in calculations has one input waveguide, output waveguides with 16 ports, and an arrayed waveguide portion having 64 optical waveguides. The planar waveguides 50a and 50b are 1,090 µm in length. The arrayed waveguide portion has a spacing d, set to 2 µm, at the junction with each planar waveguide.

Figure 13:
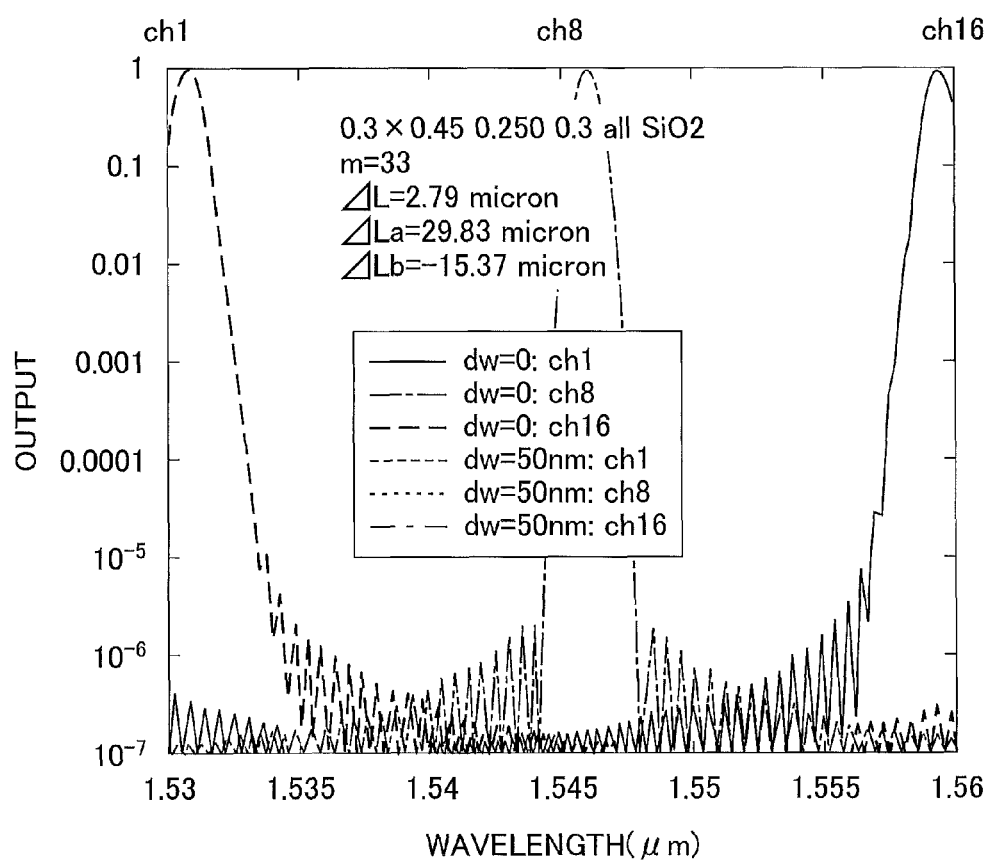
FIG. 13 is a graph, like FIG. 5, for use in understanding variation in wavelength characteristic caused by deviation in width of the optical waveguides on the AWG shown in FIG. 12.
Figure 14:
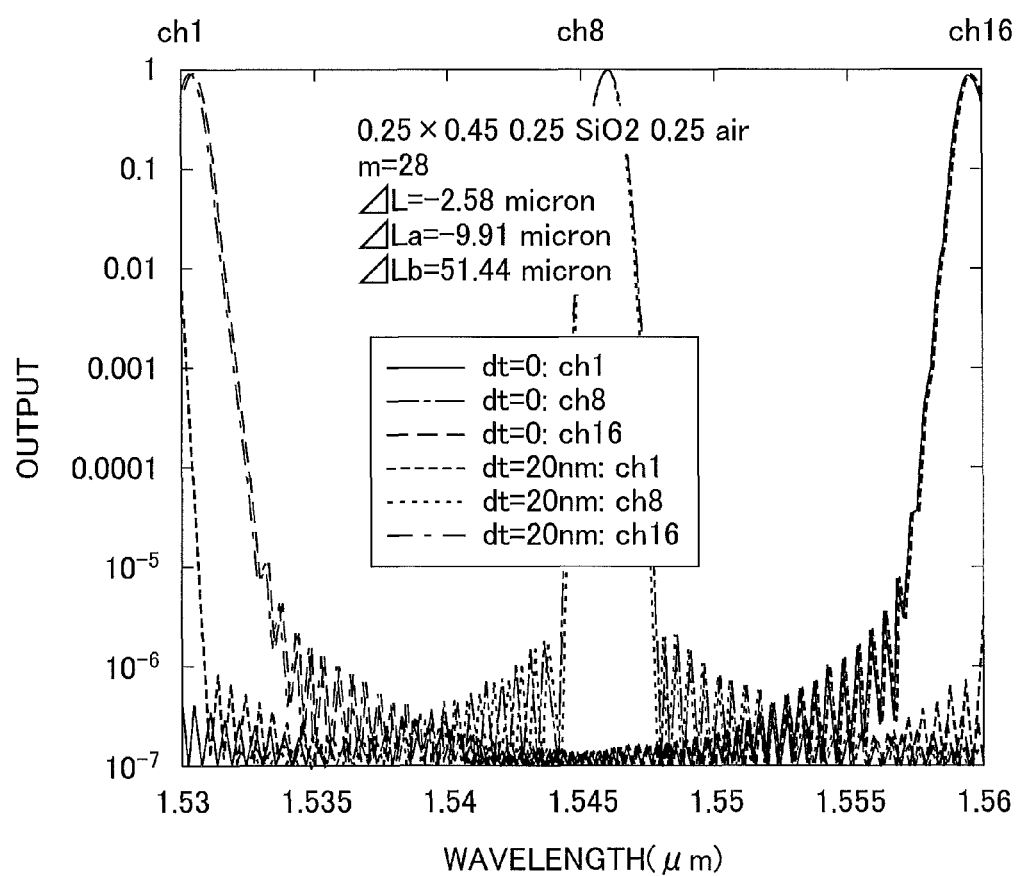
FIG. 14 is a graph, like FIG. 8, for use in understanding variation in wavelength characteristic caused by deviation in thickness of the optical waveguides on the AWG shown in FIG. 12.
Figure 15:
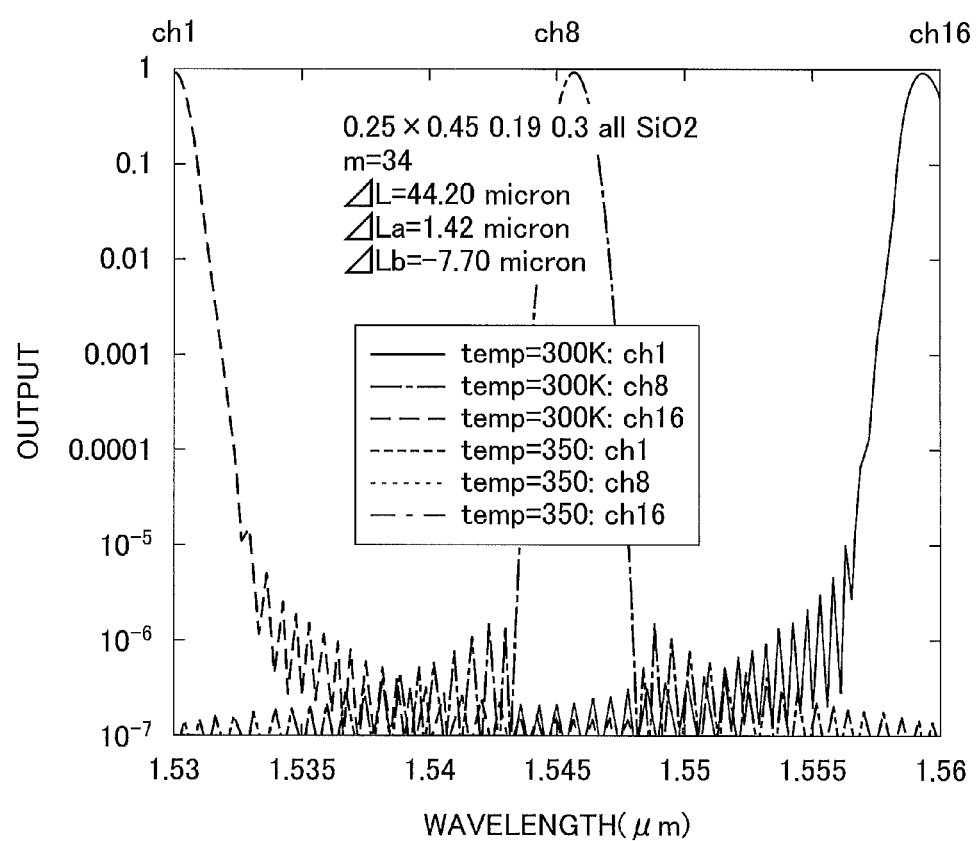
FIG. 15 is a graph, like FIG. 5, for use in understanding variation in wavelength characteristic caused by temperature fluctuation on the AWG shown in FIG. 12.

The variations in wavelength characteristic of the AWG mean the dependency of the output wavelengths from each of the output ports in the AWG as shown in FIGS. 13, 14 and 15. In those figures, the vertical axes indicate the output, or the relative intensity of the output light, normalized with the maximum output, and the horizontal axes indicate wavelength in µm. As described later, there are 16 output ports, ch1 to ch16, which involve respective wavelength characteristics. However, FIGS. 13, 14 and 15 show the wavelength characteristics on the channels ch1, ch8 and ch16 corresponding to the minimum, center and maximum wavelengths, respectively.

Variations in wavelength characteristic responsive to a deviation in width of an optical waveguide of an AWG according to the present invention are shown in FIG. 13. In the AWG of the alternative embodiment, two wavelengths, i.e. the minimum and maximum wavelengths, are held constant against width errors caused during fabrication. Each optical waveguide has a reference, a first adjustment and a second adjustment section which are different only in waveguide width and have the top, side and bottom surfaces thereof made contact with the cladding layer of $SiO_2$.

With respect to the dimensions of the optical waveguide, the thickness is 250 nm, and the widths of the waveguides in the reference, first adjustment and second adjustment sections are 250 nm, 450 nm and 300 nm, respectively. The path length differences $\Delta L$, $\Delta L_a$ and $\Delta L_b$ in the reference, first adjustment and second adjustment sections are 2.79 µm, 29.83 µm and –15.37 µm, respectively. The interference order m=33. Because of this structure, the wavelength characteristic can be held constant.

FIG. 13 shows the wavelength characteristics caused, with respect to a designed waveguide width, when there was no increase in width, i.e. width error dw=0 nm, and when there was an increase in width of 50 nm, i.e. width error dw=50 nm. The results of the calculations show that the wavelength characteristics showed no significant variations when the width error dw was 50 nm. In respect of those channels ch1, ch8 and ch16 corresponding to the minimum, center and maximum wavelengths, respectively, no variations in characteristic were observed. From that, it can be seen that the wavelength characteristics of FIG. 13 involve variations caused by width deviation being reduced over the entire operating wavelength range, like FIG. 9B.

The AWG of the alternative embodiment shows more conspicuous effects than the AWG in the previous embodiment shown in FIG. 6. The AWG of the previous embodiment utilizes a two-region method in which the center wavelength is held constant against fabrication width errors. In the AWG of the previous embodiment, when the width error increased to 50 nm, the characteristic at the channel ch8 near the center wavelength remained unchanged whereas the characteristic on the channels at the opposite ends of the wavelength range, i.e. ch1 and ch16, showed significant deviations. By contrast, in the AWG of the alternative embodiment based upon a three-region method in which the minimum and maximum wavelengths were held constant against fabrication width errors, even when the width error was increased to 50 nm, the characteristic on those channels ch1, ch8 and ch16 showed no variations, as seen from FIG. 13.

Variations in wavelength characteristic responsive to a deviation in thickness of an optical waveguide of the AWG to which an optical wavelength filter is applied in accordance with the present invention are shown in FIG. 14. In the AWG of the alternative embodiment, two wavelengths, i.e. maximum and minimum wavelengths, are held constant against thickness errors caused during fabrication.

The thickness of each optical waveguide in the reference, first adjustment and second adjustment sections are constant to the value of 250 nm. The optical waveguide in the reference section has a width of 250 nm, and its top, side and bottom surfaces are in contact with the cladding layer of $SiO_2$. The optical waveguide in the first adjustment section has a width of 450 nm, and its top, side and bottom surfaces are in contact with the cladding layer. The optical waveguide in the second adjustment section has a width of 250 nm, and its side and bottom surfaces are in contact with the cladding layer while its top surface is in contact with the air.

The path length differences $\Delta L$, $\Delta L_a$ and $\Delta L_b$ in the reference, first adjustment and second adjustment sections are −2.51 μm, −9.91 μm and 51.44 μm, respectively. The interference order m=28. Because of this structure, the two wavelengths can be held constant as defined.

FIG. 14 shows the wavelength characteristics caused, with respect to a designed waveguide width, when there was no increase in thickness, i.e. thickness error dt=0 nm, and when there was an increase in thickness of 20 nm, i.e. thickness error dt=20 nm. The results of the calculations show that the wavelength characteristics showed no significant variations even when the thickness error dt was 20 nm. In respect to those channels ch1, ch8 and ch16 corresponding to the minimum, center and maximum wavelengths, no variations were observed in wavelength characteristic. From that, it can be seen that the wavelength characteristics of FIG. 14 involve variations caused by thickness deviation being reduced over the whole operating wavelength range, like FIG. 9B.

Variations in wavelength characteristic of the AWG according to the present invention caused by temperature fluctuation are shown in FIG. 15. In the AWG of the alternative embodiment, the two wavelengths, i.e. the minimum and maximum wavelengths, are held constant against temperature fluctuation. The optical waveguides are different only in width of the reference, first adjustment and second adjustment sections, and the top, side and bottom surfaces thereof are in contact with the cladding layer of $SiO_2$.

Each optical waveguide has its thickness of 250 nm, and its widths in the reference, first adjustment and second adjustment sections of 190 nm, 450 nm and 300 nm, respectively. The path length differences $\Delta L$, $\Delta L_a$ and $\Delta L_b$ in the reference, first adjustment and second adjustment sections are 44.2 μm, 1.42 μm and −7.70 μm, respectively. The interference order m=32. Because of this structure, the two wavelengths can be held constant.

Finally, FIG. 15 shows the wavelength characteristics caused, with respect to a designed waveguide temperature of 300 K, when there was no temperature fluctuation, i.e. temperature deviation=0 K, and when the temperature rose to 350 K, i.e. temperature deviation=50 K. The results of the calculations demonstrate that the wavelength characteristics showed no significant variations even when the temperature fluctuates up to 50 K. In respect of those channels ch1, ch8 and ch16 corresponding to the minimum, center and maximum wavelengths, respectively, no variations were observed in wavelength characteristic. From that, it can be seen that variations in the wavelength characteristics of FIG. 15 involve variations caused by temperature fluctuation being reduced over the entire operating wavelength range, like FIG. 9B.

The entire disclosure of Japanese patent application No. 2010-191187 filed on Aug. 27, 2010, including the specification, claims, accompanying drawings and abstract of the disclosure is incorporated herein by reference in its entirety.

While the present invention has been described with reference to the particular illustrative embodiments, it is not to be restricted to the embodiments. It is to be appreciated that those skilled in the art can change or modify the embodiments without departing from the scope and spirit of the present invention.

What is claimed is:

1. An optical wavelength filter for separating input light having different wavelengths multiplexed into respective wavelengths of light to output the separated wavelengths of light, said filter comprising:
   a plurality of optical waveguides for propagating the input light from an input end receiving the input light to an output end,
   each of said plurality of optical waveguides comprising:
   a substrate,
   a cladding layer formed on said substrate, and
   a core of a material having a refractive index at least as high as a refractive index of said cladding layer multiplied by a factor of 1.4, said core being formed on said cladding layer in a strip-like shape having a thickness of 400 nm at most,
   each of said plurality of optical waveguides being partitioned into a reference section providing a reference and an adjustment section for adjusting a phase difference,
   said reference section being set to a first partitioning condition in which the optical waveguide in said reference section has a first equivalent refractive index and a first length,
   said adjustment section being set to a second partitioning condition in which the optical waveguide in said adjustment section has a second equivalent refractive index and a second length,
   whereby an interference condition is satisfied in which two waves of light outputted from the output ends of adjacent two of said optical waveguides interfere with each other with a predetermined phase difference therebetween,
   wherein the first and second partitioning conditions are set for one of the different wavelengths of the input light such that, even when an operating ambient temperature varies or said plurality of optical waveguides involve a dimensional error, the interference condition is satisfied to thereby reduce a variation in wavelength characteristic of said filter.

2. The filter in accordance with claim 1, wherein the one wavelength is a center wavelength of the input light.

3. The filter in accordance with claim 1, wherein, between said reference section and said adjustment section, the optical waveguides are different in at least one of a width and a thickness of the optical waveguides and a material of said cladding layer, and a mode in which said core is in contact with said cladding layer.

4. The filter in accordance with claim 1, wherein the dimensional error is a fabrication error in at least one of a width direction and a thickness direction of the optical waveguide.

5. The filter in accordance with claim 1, wherein said substrate is an SOI (Silicon-On-Insulator) substrate comprising a silicon substrate, a silicon oxide film formed on said silicon substrate and a silicon layer formed on said silicon oxide film, wherein the optical waveguides are silicon waveguides in which said cladding layer is formed by said silicon oxide film, and said core is formed by said silicon layer.

6. An optical wavelength filter for separating input light having different wavelengths multiplexed into respective wavelengths of light to output the separated wavelengths of light, said filter comprising:

a plurality of optical waveguides for propagating the input light from an input end receiving the input light to an output end, each of said plurality of optical waveguides comprising:
a substrate,
a cladding layer formed on said substrate, and
a core of a material having a refractive index at least as high as a refractive index of said cladding layer multiplied by a factor of 1.4, said core being formed on said cladding layer in a strip-like shape having a thickness of 400 nm at most, each of said plurality of optical waveguides being partitioned into a reference section providing a reference and an adjustment section for adjusting a phase difference, said reference section being set to a first partitioning condition in which the optical waveguide in said reference section has a first equivalent refractive index and a first length, said adjustment section being set to a second partitioning condition in which the optical waveguide in said adjustment section has a second equivalent refractive index and a second length, whereby an interference condition is satisfied in which two waves of light outputted from the output ends of adjacent two of said optical waveguides interfere with each other with a predetermined phase difference therebetween, wherein, in one of said reference section and said adjustment section, said core of the optical waveguide has top, side and bottom surfaces that are in contact with said cladding layer of the optical waveguide, and in another of said reference section and said adjustment section, said core of the optical waveguide has top and side surfaces that are in contact with air, and a bottom surface that is in contact with said cladding layer of the optical waveguide.

7. An optical wavelength filter for separating input light having different wavelengths multiplexed into respective wavelengths of light to output the separated wavelengths of light, said filter comprising:

a plurality of optical waveguides for propagating the input light from an input end receiving the input light to an output end, each of said plurality of optical waveguides comprising:
a substrate,
a cladding layer formed on said substrate, and
a core of a material having a refractive index at least as high as a refractive index of said cladding layer multiplied by a factor of 1.4, said core being formed on said cladding layer in a strip-like shape having a thickness of 400 nm at most, each of said plurality of optical waveguides being partitioned into a reference section providing a reference and a first and a second adjustment section for adjusting a phase difference, said reference section being set to a first partitioning condition in which the optical waveguide in said reference section has a first equivalent refractive index and a first length, said first adjustment section being set to a second partitioning condition in which the optical waveguide in said first adjustment section has a second equivalent refractive index and a second length, said second adjustment section being set to a third partitioning condition in which the optical waveguide in said second adjustment section has a third equivalent refractive index and a third length, whereby an interference condition is satisfied in which two waves of light outputted from the output ends of adjacent two of said optical waveguides interfere with each other with a predetermined phase difference therebetween, wherein the first, second and third partitioning conditions are set for two of the different wavelengths of the input light such that, even when an operating ambient temperature varies or said plurality of optical waveguides involve a dimensional error, the interference condition is satisfied to thereby reduce a variation in wavelength characteristic of said filter.

8. The filter in accordance with claim 7, wherein the two wavelengths are a minimum wavelength and a maximum wavelength of the input light.

9. The filter in accordance with claim 7, wherein, between said reference section, said first adjustment section and said second adjustment section, the optical waveguides are different in at least one of a width and a thickness of the optical waveguides and a material of said cladding layer, and a mode in which said core is in contact with said cladding layer.

10. The filter in accordance with claim 7, wherein, between said reference section and one of said first and second adjustment sections, the optical waveguides are different in at least one of a width of the optical waveguides and a material of said cladding layer, and between said reference section and another of said first and second adjustment sections, the optical waveguides are different in a mode in which said core is in contact with said cladding layer.

11. The filter in accordance with claim 7, wherein the dimensional error is a fabrication error in at least one of a width direction and a thickness direction of the optical waveguide.

12. The filter in accordance with claim 7, wherein said substrate is an SOI (Silicon-On-Insulator) substrate comprising a silicon substrate, a silicon oxide film formed on said silicon substrate and a silicon layer formed on said silicon oxide film, wherein the optical waveguides are silicon waveguides in which said cladding layer is formed by said silicon oxide film, and said core is formed by said silicon layer.

13. An optical wavelength filter for separating input light having different wavelengths multiplexed into respective wavelengths of light to output the separated wavelengths of light, said filter comprising:

a plurality of optical waveguides for propagating the input light from an input end receiving the input light to an output end, each of said plurality of optical waveguides comprising:
a substrate,
a cladding layer formed on said substrate, and
a core of a material having a refractive index at least as high as a refractive index of said cladding layer multiplied by a factor of 1.4, said core being formed on said cladding layer in a strip-like shape having a thickness of 400 nm at most, each of said plurality of optical waveguides being partitioned into a reference section providing a reference and a first and a second adjustment section for adjusting a phase difference, said reference section being set to a first partitioning condition in which the optical waveguide in said reference section has a first equivalent refractive index and a first length, said first adjustment section being set to a second partitioning condition in which the optical waveguide in said first adjustment section has a second equivalent refractive index and a second length, said second adjustment section being set to a third partitioning condition in which the optical waveguide in said second adjustment section has a third equivalent refractive index and a third length, whereby an interference condition is satisfied in which two waves of light outputted from the output ends of adjacent two of said optical waveguides interfere with each other with a predetermined phase difference therebetween, wherein, in one of said reference section and said first and second adjustment sections, said core of the optical waveguide has top, side and bottom surfaces that are in contact with said cladding layer, and in remaining two of said reference section and said first and second adjustment sections, said cores of the optical waveguides have top and side surfaces that are in contact with air, and bottom surfaces that are in contact with said cladding layer.

14. An optical wavelength filter for separating input light having different wavelengths multiplexed into respective wavelengths of light to output the separated wavelengths of light, said filter comprising:

a plurality of optical waveguides for propagating the input light from an input end receiving the input light to an output end, each of said plurality of optical waveguides comprising:
a substrate,
a cladding layer formed on said substrate, and
a core of a material having a refractive index at least as high as a refractive index of said cladding layer multiplied by a factor of 1.4, said core being formed on said cladding layer in a strip-like shape having a thickness of 400 nm at most, each of said plurality of optical waveguides being partitioned into a reference section providing a reference and a first and a second adjustment section for adjusting a phase difference, said reference section being set to a first partitioning condition in which the optical waveguide in said reference section has a first equivalent refractive index and a first length, said first adjustment section being set to a second partitioning condition in which the optical waveguide in said first adjustment section has a second equivalent refractive index and a second length, said second adjustment section being set to a third partitioning condition in which the optical waveguide in said second adjustment section has a third equivalent refractive index and a third length, whereby an interference condition is satisfied in which two waves of light outputted from the output ends of adjacent two of said optical waveguides interfere with each other with a predetermined phase difference therebetween, wherein, in one of said reference section and said first and second adjustment sections, said core of the optical waveguide has top and side surfaces that are in contact with air, and a bottom surface that is in contact with said cladding layer, and in remaining two of said reference section and said first and second adjustment sections, said cores of the optical waveguides have top, side and bottom surfaces that are in contact with said cladding layer.

\* \* \* \* \*